United States Patent
Park et al.

(10) Patent No.: US 12,395,755 B2
(45) Date of Patent: Aug. 19, 2025

(54) IMAGE SENSOR DEVICE AND OPERATION METHOD THEREOF WITH DUMMY CODE GENERATOR

(71) Applicant: SAMSUNG ELECTRONICS CO., LTD., Suwon-si (KR)

(72) Inventors: Sanghee Park, Suwon-si (KR); Seongjin Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/376,131

(22) Filed: Oct. 3, 2023

(65) Prior Publication Data

US 2024/0284071 A1 Aug. 22, 2024

(30) Foreign Application Priority Data

Feb. 21, 2023 (KR) .................. 10-2023-0023011

(51) Int. Cl.
*H04N 25/63* (2023.01)
*H04N 25/633* (2023.01)
*H04N 25/77* (2023.01)
*H04N 25/772* (2023.01)

(52) U.S. Cl.
CPC .......... *H04N 25/63* (2023.01); *H04N 25/633* (2023.01); *H04N 25/77* (2023.01); *H04N 25/772* (2023.01)

(58) Field of Classification Search
CPC ...... H04N 25/63; H04N 25/633; H04N 25/77; H04N 25/772
See application file for complete search history.

(56) References Cited

U.S. PATENT DOCUMENTS

| | | | |
|---|---|---|---|
| 7,432,965 B2 | 10/2008 | Mori | |
| 8,120,677 B2 | 2/2012 | Ukita et al. | |
| 9,635,290 B2 | 4/2017 | Okura et al. | |
| 10,027,919 B2 | 7/2018 | Kobuse | |
| 10,075,704 B2 * | 9/2018 | Hoekstra | H04N 17/002 |
| 10,319,765 B2 | 6/2019 | Kato et al. | |

(Continued)

FOREIGN PATENT DOCUMENTS

| | | |
|---|---|---|
| CN | 107564925 A | 1/2018 |
| CN | 111785750 A | 10/2020 |

(Continued)

*Primary Examiner* — Nicholas G Giles
(74) *Attorney, Agent, or Firm* — Sughrue Mion, PLLC

(57) ABSTRACT

An image sensor device, including a pixel array comprising a plurality of optical black pixels and a plurality of active pixels, wherein the plurality of optical black pixels are configured to be read out during a first time period to generate first data voltages and the plurality of active pixels are configured to be read out during a second time period after the first time period to generate second data voltages; an analog-to-digital converter configured to output first pixel codes based on the first data voltages, and to output second pixel codes based on the second data voltages; an image signal processor configured to output image frame data based on the first pixel codes and the second pixel codes; and a dummy code generator configured to provide dummy codes to the image signal processor during a third time period between a first time point and a second time point, wherein the first time point is before the first time period.

20 Claims, 20 Drawing Sheets

(56) References Cited

U.S. PATENT DOCUMENTS

| | | |
|---|---|---|
| 10,672,811 B2 | 6/2020 | Jung |
| 2007/0188641 A1 | 8/2007 | Jang |
| 2016/0345005 A1* | 11/2016 | Hoekstra ............. H04N 17/002 |
| 2018/0261640 A1 | 9/2018 | Hwangbo |

FOREIGN PATENT DOCUMENTS

| | | |
|---|---|---|
| KR | 10-0790982 B1 | 1/2008 |
| KR | 10-2253023 B1 | 5/2021 |

* cited by examiner

IMAGE SENSOR DEVICE AND OPERATION METHOD THEREOF WITH DUMMY CODE GENERATOR

CROSS-REFERENCE TO RELATED APPLICATIONS

This application is based on and claims priority under 35 U.S.C. § 119 to Korean Patent Application No. 10-2023-0023011 filed on Feb. 21, 2023, in the Korean Intellectual Property Office, the disclosure of which is incorporated by reference herein in its entirety.

BACKGROUND

1. Field

The present disclosure relates to a semiconductor image sensor. More particularly, the present disclosure relates to an image sensor device and an operation method thereof.

2. Description of Related Art

An image sensor device may generate an image based on a light signal. For example, the image sensor device may include a plurality of pixels. The image sensor device may generate data voltages based on a light signal received by the plurality of pixels and may generate pixel codes based on the generated data voltages.

The image sensor device may perform a dark level compensation operation based on pixel codes generated by optical black pixels among the plurality of pixels. For example, the image sensor device may correct values of the pixel codes generated from active pixels by using values of the pixel codes generated by the optical black pixels.

However, as the degree of integration of the image sensor device increases, an error may occur in an image generated by the image sensor device due to the interaction between components of the image sensor device. For example, data voltages that are generated by a plurality of pixels may be distorted due to a difference between power consumption of the image sensor device when the optical black pixels generate data voltages and power consumption of the image sensor device when the active pixels generate data voltages. In this case, an image generated by the image sensor device may be distorted.

SUMMARY

Provided are an image sensor device with improved performance and an operation method thereof.

Additional aspects will be set forth in part in the description which follows and, in part, will be apparent from the description, or may be learned by practice of the presented embodiments.

In accordance with an aspect of the disclosure, an image sensor device includes: a pixel array comprising a plurality of optical black pixels and a plurality of active pixels, wherein the plurality of optical black pixels are configured to be read out during a first time period to generate first data voltages and the plurality of active pixels are configured to be read out during a second time period after the first time period to generate second data voltages: an analog-to-digital converter configured to output first pixel codes based on the first data voltages, and to output second pixel codes based on the second data voltages: an image signal processor configured to output image frame data based on the first pixel codes and the second pixel codes; and a dummy code generator configured to provide dummy codes to the image signal processor during a third time period between a first time point and a second time point, wherein the first time point is before the first time period.

In accordance with an aspect of the disclosure, an operation method of an image sensor device which includes a plurality of optical black pixels, a plurality of active pixels, and an image signal processor, includes: providing dummy codes to the image signal processor: performing a first readout operation on the plurality of optical black pixels while a dummy signal processing operation is performed by the image signal processor based on the dummy codes; and performing a second readout operation on the plurality of active pixels after the first readout operation is performed.

In accordance with an aspect of the disclosure, an image sensor device includes: a pixel array comprising a plurality of optical black pixels and a plurality of active pixels: an analog-to-digital converter configured to output first pixel codes from among the plurality of optical black pixels during a first time period, and to output second pixel codes from among the plurality of active pixels during a second time period after the first time period; and an image signal processor configured to output image frame data based on the first pixel codes and the second pixel codes, and perform a dummy signal processing operation beginning at a first time point preceding the first time period.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
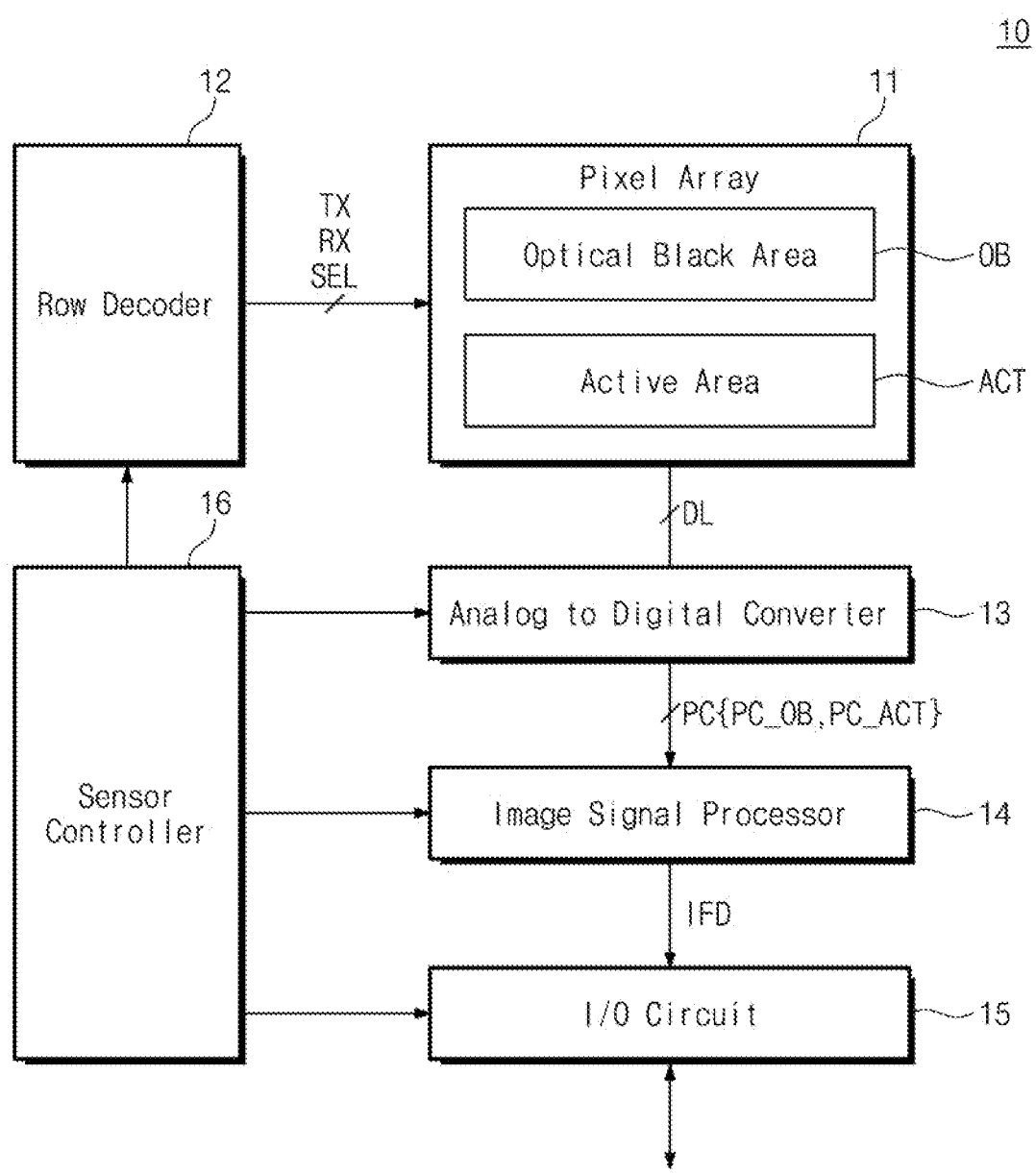
FIG. 1 is a block diagram illustrating an image sensor device according to an embodiment.

Below, embodiments of the present disclosure will be described in detail. Details such as detailed components and structures are provided only for the overall understanding of embodiments of the present disclosure. Therefore, modifications of the embodiments disclosed herein may be made by one skilled in the art without departing from the spirit and scope of the disclosure. Moreover, descriptions of well-known functions and structures may be omitted for clarity and conciseness. As illustrated in the drawings and described in the detailed description, components may be connected to any components, including components which are and which are not illustrated in a drawing or described in the detailed description. Terms used here may be defined in consideration of functions of the present disclosure and are not limited thereto. The definition of the terms should be determined based on the content throughout the disclosure.

In the detailed description, components that are described with reference to the terms "driver", "block", "unit", etc. may be implemented with software, hardware, or a combination thereof. For example, the software may be a machine code, firmware, an embedded code, or application software. For example, the hardware may include an electrical circuit, an electronic circuit, a processor, a computer, integrated circuit cores, a pressure sensor, an inertial sensor, a micro electro mechanical system (MEMS), a passive element, or a combination thereof.

FIG. 1 is a block diagram illustrating an image sensor device according to an embodiment. Referring to FIG. 1, an image sensor device 10 may include a pixel array 11, a row decoder 12, an analog-to-digital converter 13, an image signal processor (ISP) 14, an input/output (I/O) circuit 15, and a sensor controller 16.

The pixel array 11 may include a plurality of pixels arranged in a row direction and a column direction. The pixel array 11 may include an optical black area OB and an active area ACT. Below, for brevity of description, a pixel included in the optical black area OB may be referred to as an "optical black pixel", and a pixel included in the active area ACT may be referred to as an "active pixel".

Each active pixel may be configured to receive a light signal from the outside. In contrast, each optical black pixel may be configured to not receive a light signal from the outside. For example, the optical black pixels may be implemented to be similar to the active pixels; however, compared to the active pixels, each optical black pixel may further include a metal layer at the uppermost end thereof (e.g., in the uppermost layer in a direction perpendicular to a substrate of an image sensor device). However, embodiments are not limited thereto.

The row decoder 12 may be connected to the pixel array 11 through a plurality of signal lines. The row decoder 12 may provide the plurality of pixels with a transfer signal TX, a reset signal RX, and a selection signal SEL through the plurality of signal lines.

Each of the plurality of pixels may generate a data voltage in response to the transfer signal TX, the reset signal RX, and the selection signal SEL. For example, each of the plurality of pixels may generate the data voltage based on the intensity of a received light signal (however, the intensity of a light signal input to the optical black pixel may be "0"). The data voltages respectively generated by the plurality of pixels may be output through data lines DL. Below, for brevity of description, an operation in which a pixel generates a data voltage under control of the row decoder 12 may be referred to as a "readout operation".

Each of the plurality of pixels may share the transfer signal TX, the reset signal RX, and the selection signal SEL in rows. Accordingly, pixels disposed at the same row of the pixel array 11 may be simultaneously read out.

In an embodiment, in the pixel array 11, rows belonging to the optical black area OB and rows belong to the active area ACT may be different from each other. In this case, the optical black area OB and the active area ACT may be read out at different points in time. An example of a placement of the optical black area OB and the active area ACT is described in detail with reference to FIG. 17.

In an embodiment, the pixels of the optical black area OB may be read out prior to the pixels of the active area ACT. For example, in the case of reading out the optical black area OB and the active area ACT for the purpose of obtaining a single frame image, the pixels of the optical black area OB may be read out prior to the pixels of the active area ACT. However, embodiments are not limited thereto.

The analog-to-digital converter 13 may be connected to the pixel array 11 through the data lines DL. The analog-to-digital converter 13 may receive the data voltages (e.g., analog voltages) from the data lines DL. The analog-to-digital converter 13 may convert the received data voltages into digital signals. For example, the analog-to-digital converter 13 may output a value corresponding to a data voltage by using a pixel code PC (e.g., a digital signal).

The image signal processor 14 may receive pixel codes from the analog-to-digital converter 13. For example, the image signal processor 14 may sequentially receive pixel codes PC_OB of the optical black area OB and pixel codes PC_ACT of the active area ACT from the analog-to-digital converter 13.

In an embodiment, the image signal processor 14 may receive pixel codes from the analog-to-digital converter 13 in units of row of the pixel array 11. For example, pixel codes corresponding to one row of the pixel array 11 may be simultaneously provided to the image signal processor 14. However, embodiments are not limited thereto.

The image signal processor 14 may output image frame data IFD based on the received pixel codes PC. For example, the image signal processor 14 may generate the image frame data IFD by performing various types of signal processing operations on the received pixel codes PC. For example, the image signal processor 14 may perform a dark level compensation operation on the pixel codes PC_ACT of the active area ACT, based on the pixel codes PC_OB of the optical black area OB. An example of a configuration and an operation of the image signal processor 14 is described in detail with reference to FIG. 2.

In an embodiment, the power consumption of the image signal processor 14 may not be uniform. For example, the power consumption of the image signal processor 14 in a time period at which the readout operation is performed on the optical black area OB may be different from the power consumption of the image signal processor 14 in a time period at which the readout operation is performed on the active area ACT. In this case, the power consumption of the entire image sensor device 10 in the time period at which the readout operation is performed on the optical black area OB may be different from the power consumption of the entire image sensor device 10 in the time period at which the readout operation is performed on the active area ACT.

In an embodiment, when the power consumption of the image sensor device 10 changes, a data voltage that is generated through the readout operation associated with the pixel array 11 may change. For example, the fluctuations of power consumption of the image sensor device 10 may cause a distribution at a ground voltage (e.g., a ground voltage swing) of the image sensor device 10 while the pixel array 11 is read out. In this case, distortion may occur in the image frame data IFD that are generated based on the dark level compensation operation.

The I/O circuit 15 may receive the image frame data IFD from the image signal processor 14. The I/O circuit 15 may output the received image frame data IFD to an external device (e.g., a system on chip (SoC)) or an application processor (AP)).

The sensor controller 16 may control an overall operation of the image sensor device 10. For example, the sensor controller 16 may control operation timings of the pixel array 11, the row decoder 12, the analog-to-digital converter 13, the image signal processor 14, and the I/O circuit 15.

Figure 2:
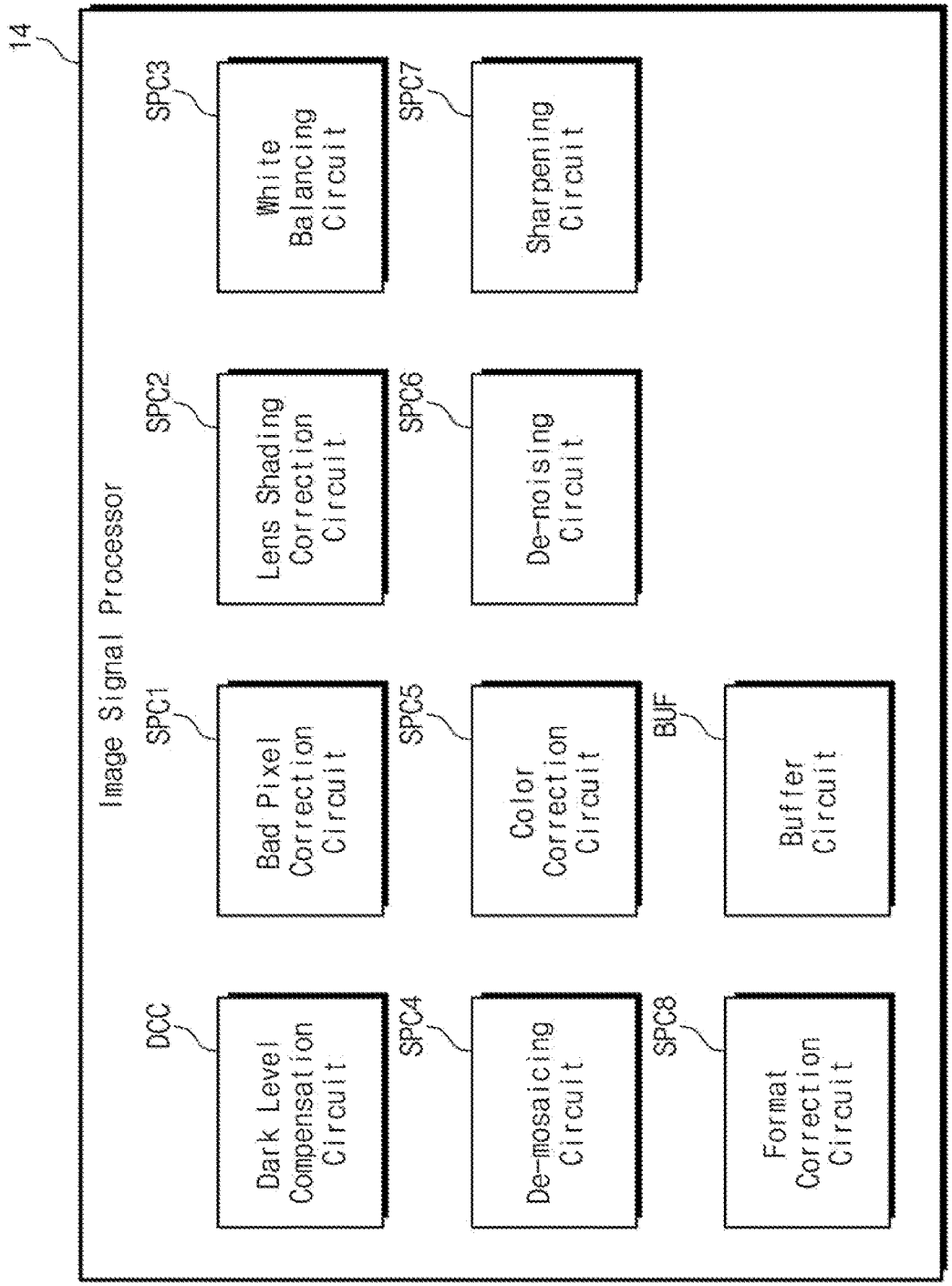
FIG. 2 is a diagram illustrating a configuration of an image signal processor of FIG. 1, according to an embodiment.

FIG. 2 is a diagram illustrating a configuration of an image signal processor of FIG. 1. Referring to FIG. 2, the image signal processor 14 may include a dark level compensation circuit DCC, a buffer circuit BUF, and first to eighth signal processing circuits SPC1 to SPC8. Below, embodiments are described in which the first signal processing circuit SPC1 includes a bad pixel correction circuit, the second signal processing circuit SPC2 includes a lens shading correction circuit, the third signal processing circuit SPC3 includes a white balancing circuit, the fourth signal processing circuit SPC4 includes a de-mosaicing circuit, the fifth signal processing circuit SPC5 includes a color correction circuit, the sixth signal processing circuit SPC6 includes a de-noising circuit, the seventh signal processing circuit SPC7 includes a sharpening circuit, and the eighth signal processing circuit SPC8 includes a format correction circuit as an example. However, embodiments are not limited thereto. For example, the image signal processor 14 may further include an arbitrary type of signal processing circuit or may not include some of the first to eighth signal processing circuits SPC1 to SPC8 illustrated in FIG. 2.

The buffer circuit BUF may store the received pixel codes PC in units of row of the pixel array 11. For example, the buffer circuit BUF may independently store pixel codes output from the analog-to-digital converter 13 at a first time point and pixel codes output from the analog-to-digital converter 13 at a second time point. In embodiments, a time point may refer to a particular point in time.

The buffer circuit BUF may provide the pixel codes PC of each row to the dark level compensation circuit DCC. For example, the buffer circuit BUF may provide the pixel codes PC_OB of the optical black area OB to the dark level compensation circuit DCC.

The dark level compensation circuit DCC may perform the dark level compensation operation on the pixel codes PC_ACT of the active area ACT, based on the pixel codes PC_OB of the optical black area OB. For example, the dark level compensation circuit DCC may correct the pixel codes PC_ACT of the active area ACT through the dark level compensation operation.

In an embodiment, the dark level compensation operation may refer to an operation of subtracting a value of the pixel codes PC_OB of the optical black area OB from a value of the pixel codes PC_ACT of the active area ACT. In this case, the pixel codes PC_ACT of the active area ACT may be adjusted based on pixel codes generated by pixels (e.g., optical black pixels) onto which a light signal is not incident. Accordingly, the image sensor device 10 may output the image frame data IFD having a wider dynamic range.

The buffer circuit BUF may be used as a working memory of the first to eighth signal processing circuits SPC1 to SPC8. For example, the buffer circuit BUF may temporarily store a plurality of data necessary for signal processing operations to be performed by the first to eighth signal processing circuits SPC1 to SPC8.

The image signal processor 14 may correct a result generated from the dark level compensation circuit DCC through the first to eighth signal processing circuits SPC1 to SPC8. For example, the image signal processor 14 may sequentially provide the result generated from the dark level compensation circuit DCC to the first to eighth signal processing circuits SPC1 to SPC8.

In an embodiment, the dark level compensation circuit DCC and the first to eighth signal processing circuits SPC1 to SPC8 may operate in series. For example, the result generated from the dark level compensation circuit DCC may be provided to the first signal processing circuit SPC1, and a result generated from the first signal processing circuit SPC1 may be provided to the second signal processing circuit SPC2, and so on. As in the above description, a result generated from the seventh signal processing circuit SPC7 may be provided to the eighth signal processing circuit SPC8. The eighth signal processing circuit SPC8 may output digital codes corresponding to the image frame data IFD. However, embodiments are not limited to the above order in which the dark level compensation circuit DCC and the first to eighth signal processing circuits SPC1 to SPC8 operate.

In an embodiment, the dark level compensation circuit DCC and the first to eighth signal processing circuits SPC1 to SPC8 may operate in an "on the fly" method. For example, each of the dark level compensation circuit DCC and the first to eighth signal processing circuits SPC1 to SPC8 may operate in response to digital codes received from a preceding component without performing a signal processing operation in units of frame of the pixel array 11.

In an embodiment, each of the dark level compensation circuit DCC and the first to eighth signal processing circuits SPC1 to SPC8 may be configured to perform a signal processing operation on a digital code. Also, each of the dark level compensation circuit DCC and the first to eighth signal processing circuits SPC1 to SPC8 may output a signal processing result in the form of a digital code. Below, for brevity of description, digital codes that are generated based on the pixel codes PC through the dark level compensation circuit DCC and the first to eighth signal processing circuits SPC1 to SPC8 may be referred to as "processed pixel codes".

In an embodiment, the power consumption of the image signal processor 14 may change depending on the number of signal processing circuits. For example, a power consumption when all the signal processing circuits of the image signal processor 14 operate may be greater than a power consumption when only the buffer circuit BUF operates among the components of the image signal processor 14.

Figure 3:
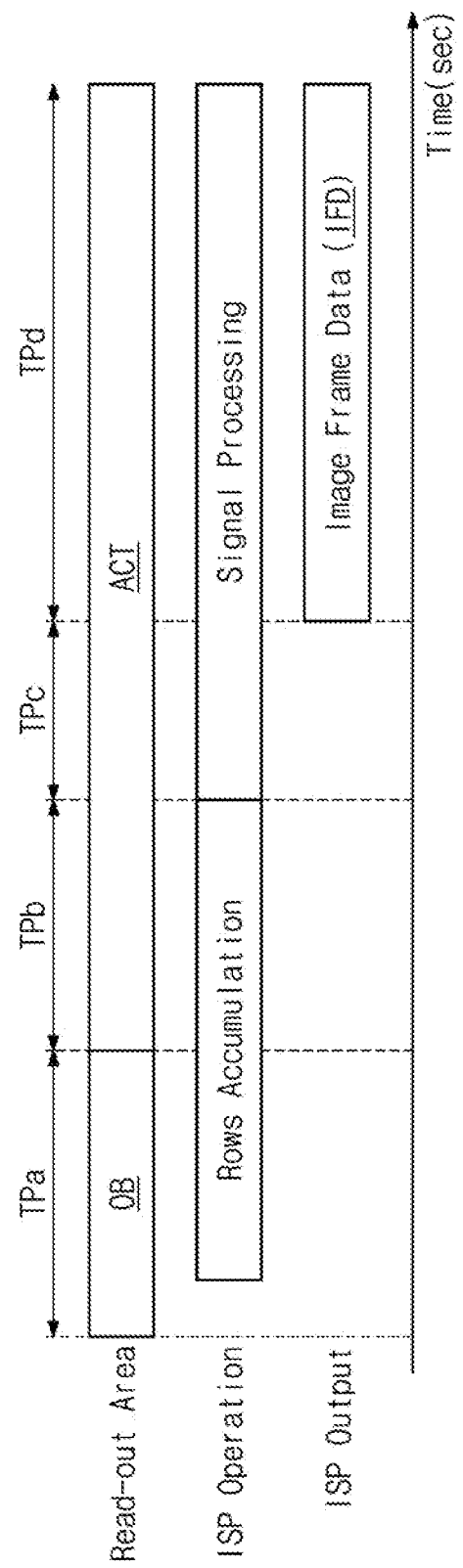
FIG. 3 is a timing diagram illustrating an operation of an image sensor device of FIG. 1, according to an embodiment.

FIG. 3 is a timing diagram illustrating an operation of an image sensor device of FIG. 1. Referring to FIGS. 1 to 3, during a first time period TPa, the optical black area OB may be read out. During second to fourth time periods TPb to TPd, the active area ACT may be read out. For example, the readout operation of the active area ACT may be performed after the readout operation of the optical black area OB is completed.

During the first and second time periods TPa and TPb, the image signal processor 14 (illustrated as "ISP") may perform a rows accumulation operation. For example, the image signal processor 14 may sequentially receive the pixel codes PC generated from the analog-to-digital converter 13. For example, the buffer circuit BUF may sequentially store the pixel codes PC_OB of the optical black area OB and the pixel codes PC_ACT of the active area ACT.

During the third and fourth time periods TPc and TPd, the image signal processor 14 may perform a signal processing operation. For example, during the third and fourth time periods TPc and TPd, the components of the image signal processor 14 may sequentially start operations. In this case, the power consumption of the image signal processor 14 may gradually increase in the third and fourth time periods TPc and TPd. Examples of the operations of the components of the image signal processor 14 are described in detail with reference to FIG. 4, and an example of the power consumption of the image signal processor 14 is described in detail with reference to FIG. 5.

During the fourth time period TPd, the image signal processor 14 may output the image frame data IFD to the I/O circuit 15. For example, in the fourth time period TPd, the image signal processor 14 may sequentially output the "processed pixel codes" generated through the signal processing operation.

In an embodiment, the numbers of components of the image signal processor 14 operating in the first to fourth time periods TPa to TPd may be different. In this case, the power consumption of the image sensor device 10 may not be uniform during the first to fourth time periods TPa to TPd. For example, the power consumption of the image signal processor 14 in the first time period TPa may be smaller than the power consumption of the image signal processor 14 in the second to fourth time periods TPb to TPd. For example, the power consumption of the image sensor device 10 in a time period at which the readout operation is performed on the optical black area OB may be different from the power consumption of the image sensor device 10 in a time period at which the readout operation is performed on the active area ACT.

In an embodiment, when the power consumption of the image sensor device 10 changes, a data voltage that is generated through the readout operation associated with the pixel array 11 may change. For example, depending on the power consumption of the image sensor device 10, an error (e.g., distortion) may occur in the magnitude of the data voltage generated through the readout operation. In this case, an error may also occur in the pixel codes PC generated based on the data voltages. Accordingly, a power consumption difference of time periods of the image sensor device 10 may cause an error in the dark level compensation operation.

In an embodiment, the error of the data voltage due to the power consumption difference of the image sensor device 10 may come from a ground voltage swing in the image sensor device 10. For example, the fluctuations of the power consumption of the image sensor device 10 may cause the swing of the ground voltage in the image sensor device 10. In this case, an error may occur in the data voltage generated through the readout operation. However, embodiments are not limited to the above cause for the error of the data voltage, that is, the fluctuations of the power consumption of the image sensor device 10. For example, the error of the data voltage may be caused by the coupling between components due to the fluctuations of the power consumption of the image sensor device 10.

Figure 4:
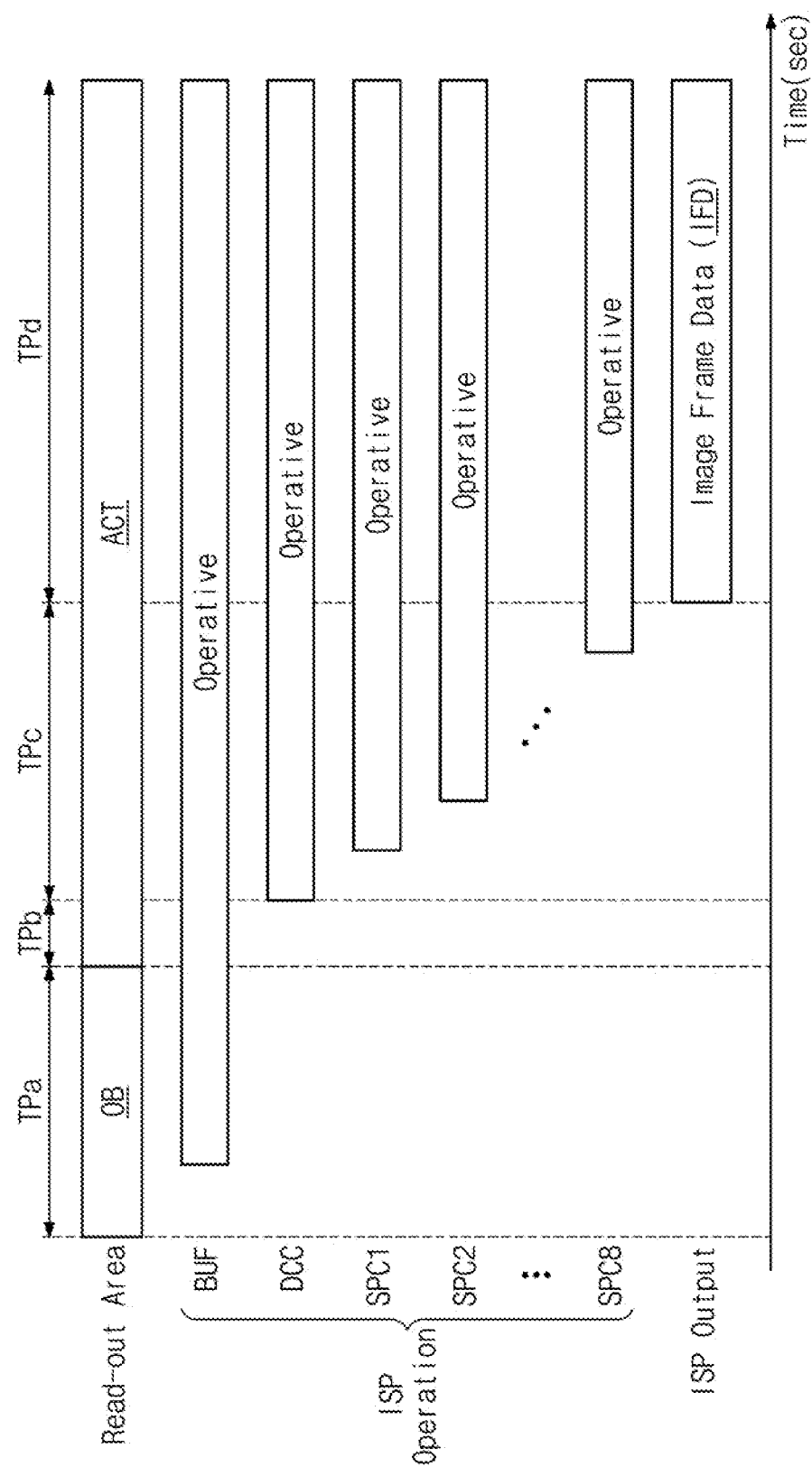
FIG. 4 is a timing diagram illustrating an operation of an image signal processor illustrated in FIG. 3 in detail, according to an embodiment.

FIG. 4 is a timing diagram illustrating an operation of an image signal processor illustrated in FIG. 3 in detail. Referring to FIGS. 1 to 4, the buffer circuit BUF may continuously be operative after receiving the pixel codes PC_OB of the optical black area OB. For example, the buffer circuit BUF may store the pixel codes PC_OB of the optical black area OB or may operate as a working memory of the first to eighth signal processing circuits SPC1 to SPC8. For brevity, redundant or duplicative description associated with the operations of the image sensor device 10 in the first to fourth time periods TPa to TPd may be omitted.

During the third time period TPc, the components of the image signal processor 14 may sequentially start operations. For example, during the third and fourth time periods TPc and TPd, the dark level compensation circuit DCC and the first to eighth signal processing circuits SPC1 to SPC8 may sequentially start operations. In this case, in the third time period TPc, the power consumption of the image signal processor 14 may gradually increase depending on the number of processing circuits operating.

During the fourth time period TPd, the image signal processor 14 may output the image frame data IFD. For example, in the fourth time period TPd, all the processing circuits of the image signal processor 14 may be in an operating state. In this case, the power consumption of the image signal processor 14 may be uniform. However, embodiments are not limited to the number of processing units operating during the fourth time period TPd.

Figure 5:
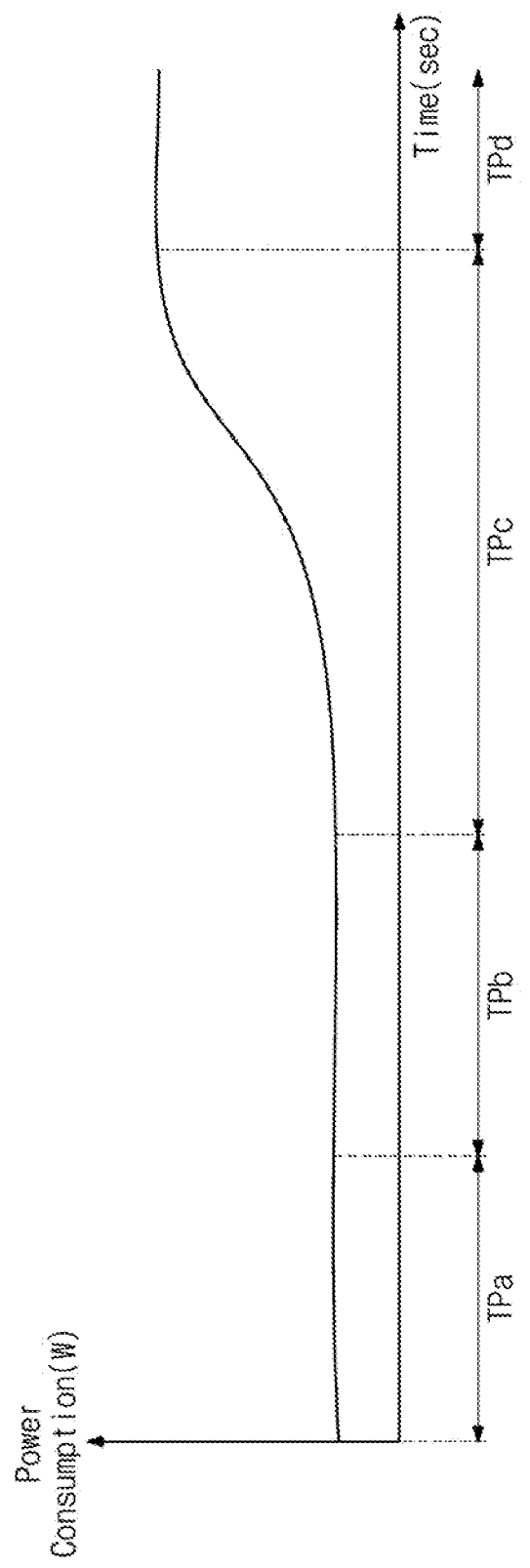
FIG. 5 is a graph illustrating power consumption in an image signal processor illustrated in FIG. 3, according to an embodiment.

FIG. 5 is a graph illustrating power consumption in an image signal processor illustrated in FIG. 3. In FIG. 5, a horizontal axis represents a time, and a vertical axis represents power consumption of the image signal processor 14.

Referring to FIGS. 1 to 5, in the first time period TPa and the second time period TPb, the power consumption of the image signal processor 14 may be almost uniform. For example, during the first time period TPa and the second time period TPb, only the buffer circuit BUF among the components of the image signal processor 14 may operate, and the remaining components may not operate.

In the third time period TPc, the power consumption of the image signal processor 14 may gradually increase. For example, as the dark level compensation circuit DCC and the first to eighth signal processing circuits SPC1 to SPC8 sequentially operate, the power consumption of the image signal processor 14 may gradually increase. In the fourth time period TPd, the power consumption of the image signal processor 14 may be uniform.

In an embodiment, in the first time period TPa, the readout operation may be performed on the optical black area OB. In contrast, in the second to fourth time periods TPb to TPd, the readout operation may be performed on the active area ACT. Accordingly, the power consumption of the image signal processor 14 may not be uniform while the optical black area OB and the active area ACT are read out.

In an embodiment, when the power consumption of the image signal processor 14 is not uniform, the swing may occur at the ground voltage of the image sensor device 10. In this case, in the dark environment, the magnitude of the pixel code generated in the optical black area OB may be different from the magnitude of the pixel code generated in the active area ACT. Therefore, according to the embodiment described with reference to FIGS. 1 to 5, an error may occur in the dark level compensation operation.

Also, during the second to fourth time periods TPb to TPd in which the readout operation is performed on the active area ACT, the power consumption of the image sensor device 10 may not be uniform. In this case, even if the light signal with the same intensity is provided to the rows of the active area ACT, the rows of the active area ACT may generate data voltages of different magnitudes. For example, according to the embodiment described with reference to FIGS. 1 to 5, distortion may be included in the image frame data IFD.

Figure 6:
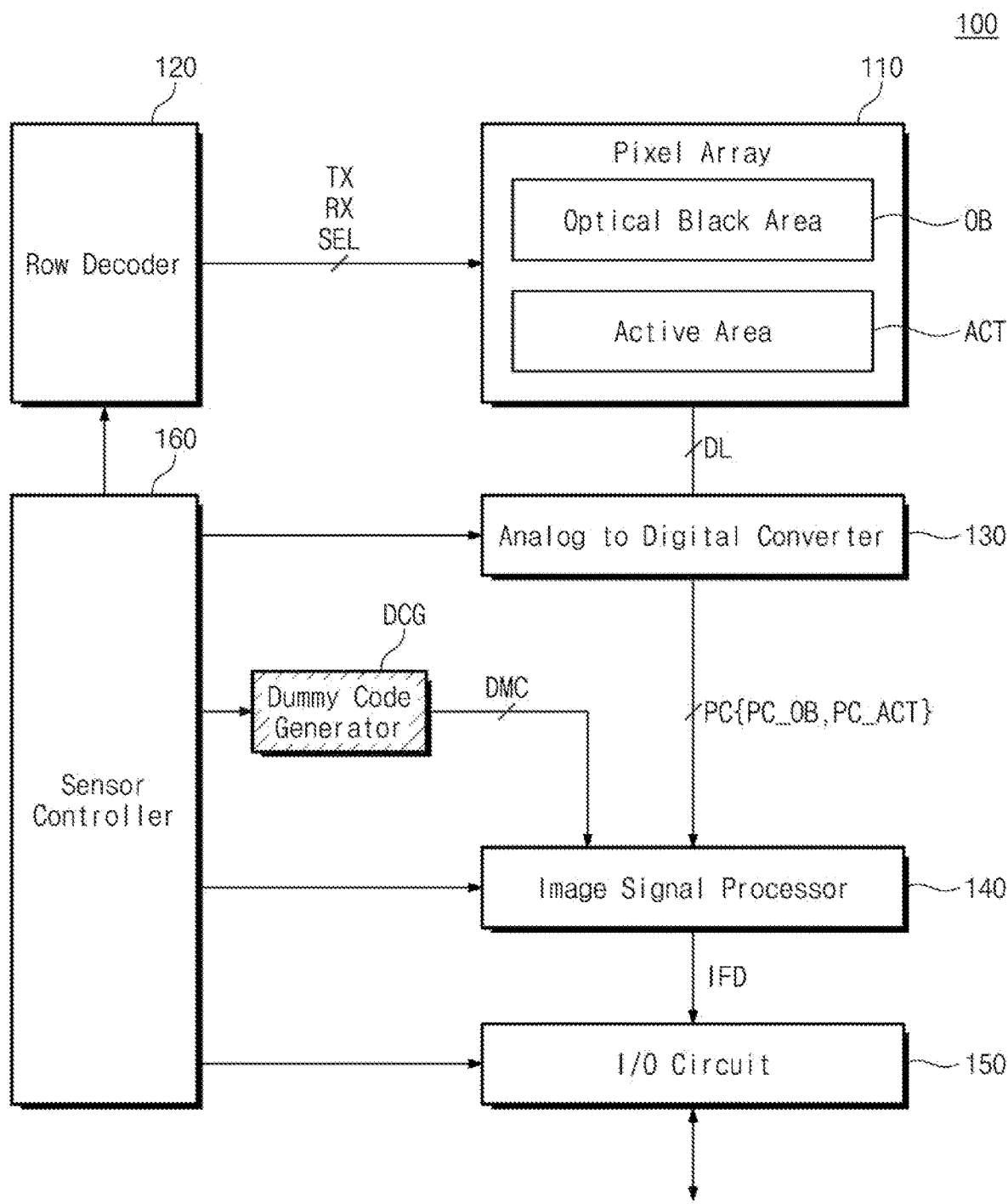
FIG. 6 is a block diagram illustrating an image sensor device according to embodiment.

FIG. 6 is a block diagram illustrating an image sensor device according to embodiment of the present disclosure. Referring to FIG. 6, an image sensor device 100 may include a pixel array 110, a row decoder 120, an analog-to-digital converter 130, an image signal processor 140, an I/O circuit 150, a sensor controller 160, and a dummy code generator DCG. Functions and operations of the pixel array 110, the row decoder 120, the analog-to-digital converter 130, the image signal processor 140, the I/O circuit 150, and the sensor controller 160 may be similar to those described with reference to FIG. 1, and thus, additional description will be omitted to avoid redundancy.

The dummy code generator DCG may provide dummy codes DMC to the image signal processor 140 under control of the sensor controller 160. For example, before the readout operation is performed on the optical black area OB, the dummy code generator DCG may provide the dummy codes DMC to the image signal processor 140.

In an embodiment, the dummy codes DMC may be random codes that may be determined regardless of a value of the pixel codes PC, and therefore may have no relevance to the pixel codes PC.

In an embodiment, the dummy code generator DCG may be implemented with a linear-feedback shift register (LFSR). However, embodiments are not limited thereto.

The image signal processor 140 may receive the dummy codes DMC. The image signal processor 140 may perform the signal processing operation based on the dummy codes DMC. For example, the image signal processor 140 may perform various types of signal processing operations described with reference to FIG. 2 with respect to the dummy codes DMC. An example of a configuration and an operation of the image signal processor 140 is described in detail with reference to FIGS. 7 to 11.

In an embodiment, the image signal processor 140 may receive the dummy codes DMC before the readout operation is performed on the optical black area OB. In this case, the image signal processor 140 may start the signal processing operation on the dummy codes DMC before the readout operation is performed on the optical black area OB. Therefore, according to an embodiment, before the readout operation is performed on the optical black area OB, the power consumption of the image signal processor 140 may increase.

In an embodiment, through the signal processing operation of the dummy codes DMC, the power consumption of the image signal processor 140 while the readout operation is performed on the optical black area OB may increase to substantially the same level as the power consumption of the image signal processor 140 while the readout operation is performed on the active area ACT.

For example, according to an embodiment of the present disclosure, the power consumption of the image sensor device 100 may be uniform while the optical black area OB and the active area ACT are read out. Therefore, according to an embodiment of the present disclosure, an environment condition under which the optical black area OB and the active area ACT are read out (e.g., the power consumption of the image sensor device 100 and the ground voltage of the image sensor device 100) may be uniform, and a performance of the dark level compensation operation of the image sensor device 10 may be improved, for example by avoiding a distortion discussed above.

The image signal processor 140 may output the image frame data IFD corresponding to the received pixel codes PC. For example, the image frame data IFD may not correspond to data generated through the signal processing operation of the dummy codes DMC. For example, the image signal processor 140 may crop data generated through the signal processing operation of the dummy codes DMC and may output data generated through the signal processing operation of the pixel codes PC as the image frame data IFD.

In an embodiment, the image signal processor 140 may be configured to crop the data generated through the signal processing operation of the dummy codes DMC, based on the number of rows of the received codes. An example of a cropping operation of the image signal processor 140 is described in detail with reference to FIGS. 7 to 9 and 15.

In an embodiment, the image sensor device 100 may operate in different operation modes based on external illuminance. For example, in a high-illuminance environment, operations of the image sensor device 100 may be similar to those described with reference to FIG. 1. In contrast, in a low-illuminance environment, the image sensor device 100 may generate the dummy codes DMC such that power consumption is uniformly maintained while the readout operation is performed on the pixel array 110. An example of an operation of the image sensor device 100 that operates in different operation modes depending on external illuminance is described in detail with reference to FIGS. 18 and 19.

Figure 7:
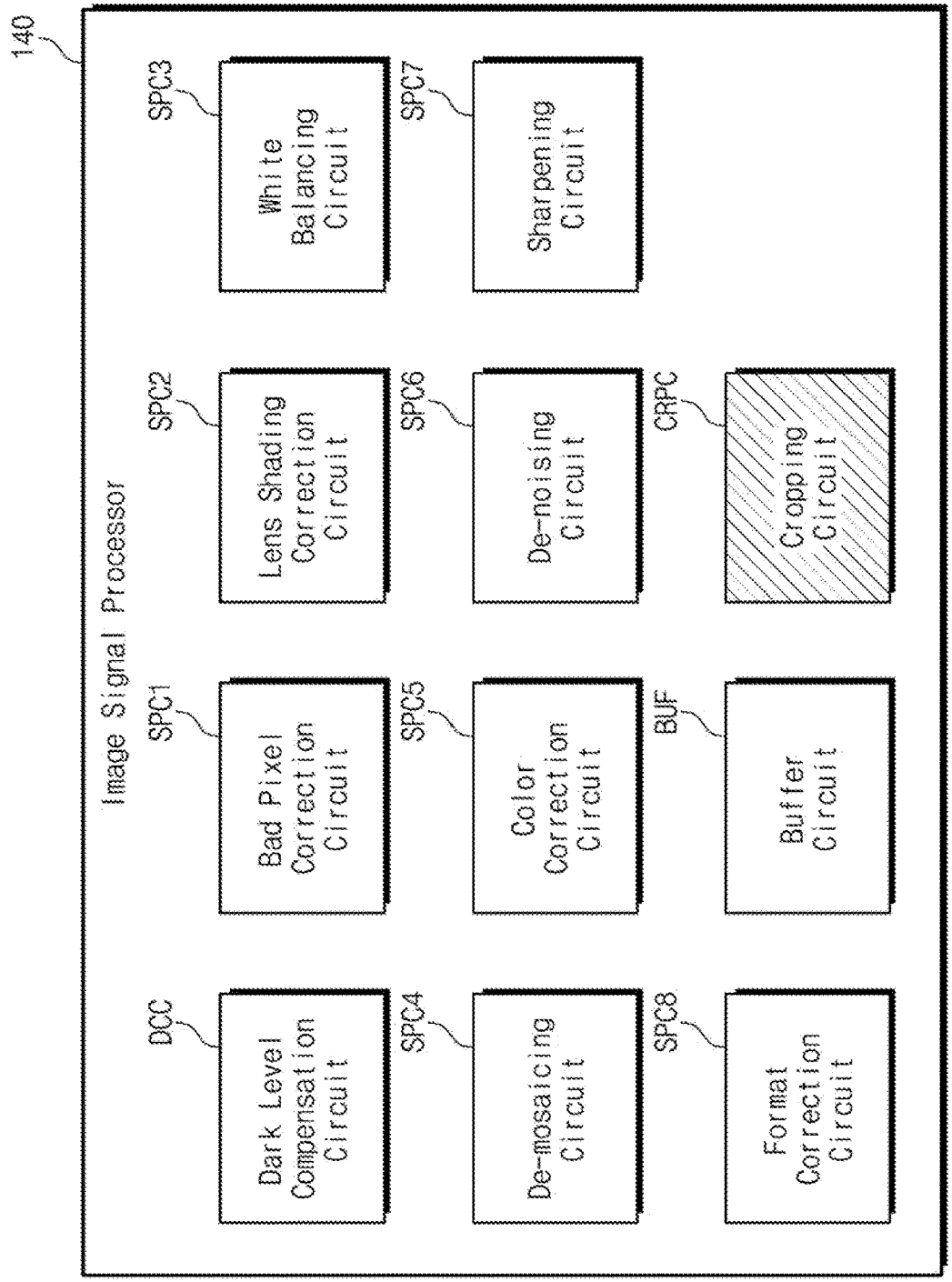
FIG. 7 is a diagram illustrating a configuration of an image signal processor of FIG. 6, according to an embodiment.

FIG. 7 is a diagram illustrating a configuration of an image signal processor of FIG. 6. Referring to FIG. 7, the image signal processor 140 may include the dark level compensation circuit DCC, the buffer circuit BUF, the first to eighth signal processing circuits SPC1 to SPC8, and a cropping circuit CRPC. Operations of the dark level compensation circuit DCC, the buffer circuit BUF, and the first to eighth signal processing circuits SPC1 to SPC8 may be similar to those described with reference to FIG. 2, and thus, additional description will be omitted to avoid redundancy.

The dark level compensation circuit DCC and the first to eighth signal processing circuits SPC1 to SPC8 may generate processed codes by performing the signal processing operations on the pixel codes PC as in the above description given with reference to FIG. 2. Below, for brevity of description, the signal processing operation performed on the pixel codes PC may be referred to as a "pixel signal processing operation". Also, the processed codes generated through the pixel signal processing operation may be referred to as "processed pixel codes", which may be denoted as "PRC_PC".

The first to eighth signal processing circuits SPC1 to SPC8 may generate the processed codes by performing the signal processing operations on the dummy codes DMC as in the above description given with reference to FIG. 2. Below, for brevity of description, the signal processing operation performed on the dummy codes DMC may be referred to as a "dummy signal processing operation". Also, the processed codes generated through the dummy signal processing operation may be referred to as "processed dummy codes", which may be denoted as "PRC_DMC".

In an embodiment, the dummy codes DMC may be provided to the first to eighth signal processing circuits SPC1 to SPC8 without passing through the dark level compensation circuit DCC. For example, the dummy codes DMC may be stored in the buffer circuit BUF and may then be provided to the first to eighth signal processing circuits SPC1 to SPC8. However, embodiments are not limited thereto.

The cropping circuit CRPC may receive the processed codes, which may be denoted as "PRC", generated through the first to eighth signal processing circuits SPC1 to SPC8. The processed codes may include the processed pixel codes and the processed dummy codes described above. The cropping circuit CRPC may perform the cropping operation on the received processed codes to output the image frame data IFD.

The cropping circuit CRPC may determine whether the received processed codes are the processed pixel codes or the processed dummy codes. The cropping circuit CRPC may crop the processed dummy codes and may output the processed pixel codes. Accordingly, the image frame data IFD may not include the processed dummy codes and may include the processed pixel codes. An example of an operation of the cropping circuit CRPC is described in detail with reference to FIGS. 7, 9, and 14.

Figure 8:
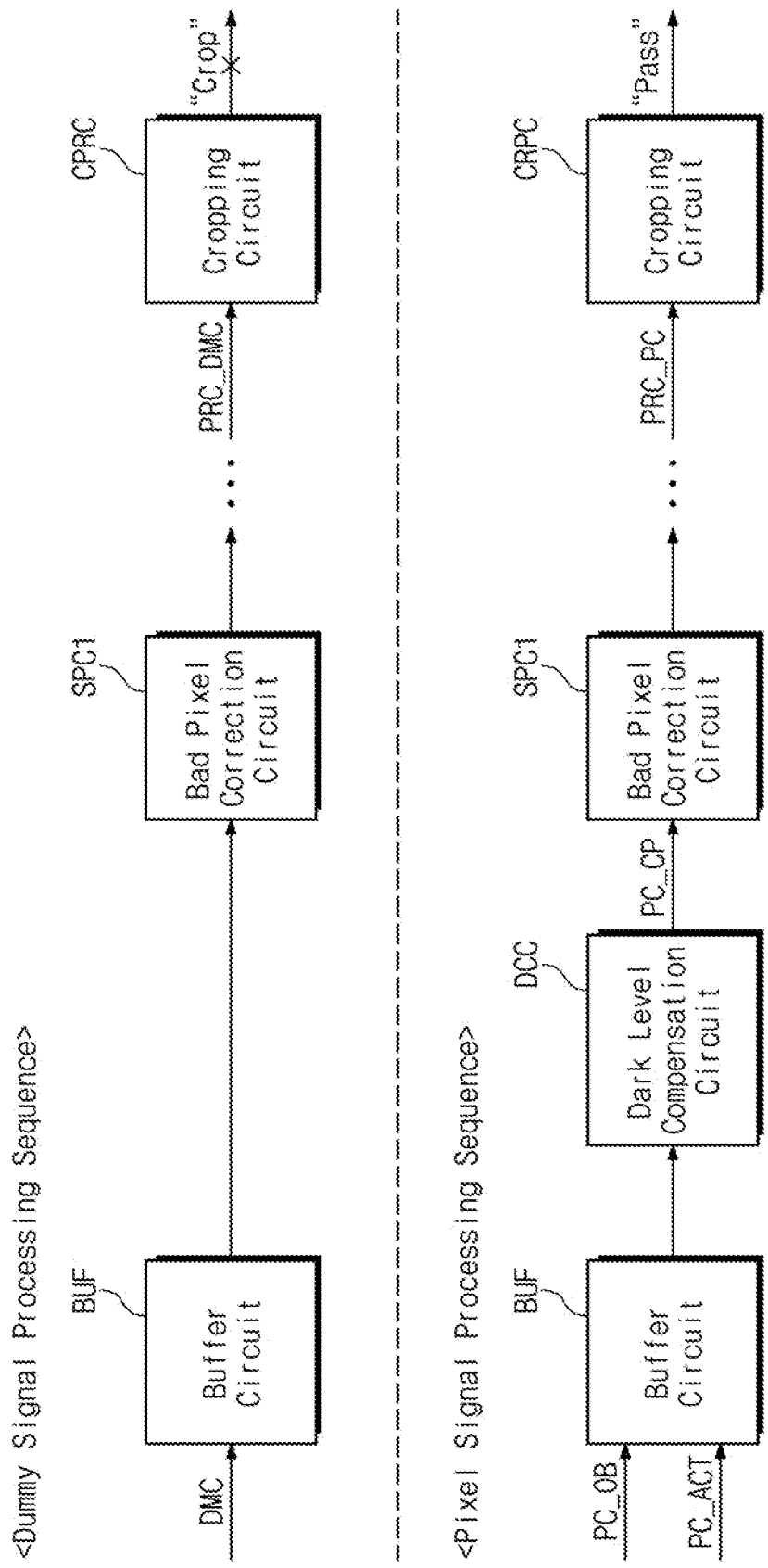
FIG. 8 is a block diagram illustrating an operation sequence of an image signal processor of FIG. 7, according to an embodiment.

FIG. 8 is a block diagram illustrating an operation sequence of an image signal processor of FIG. 7. Below, examples of a dummy signal processing sequence and a pixel signal processing sequence are described with reference to FIGS. 6 to 8.

First, when the dummy codes DMC are input to the image signal processor 140, the buffer circuit BUF may store the received dummy codes DMC. The buffer circuit BUF may provide the dummy codes DMC to the first signal processing circuit SPC1.

The dummy codes DMC may be sequentially processed through the first to eighth signal processing circuits SPC1 to SPC8. For example, the first to eighth signal processing circuits SPC1 to SPC8 may generate the processed dummy codes PRC_DMC by performing the processing operations on the dummy codes DMC in series.

The cropping circuit CRPC may receive the processed dummy codes PRC_DMC. In this case, the cropping circuit CRPC may operate in a cropping mode to crop the received processed dummy codes PRC_DMC. For example, even though the processed dummy codes PRC_DMC may be received, the cropping circuit CRPC may not output the image frame data IFD.

In an embodiment, an operation in which the cropping circuit CRPC does not output the processed dummy codes PRC_DMC may be referred to as a "cropping operation".

In contrast, when the pixel codes PC are input to the image signal processor 140, the buffer circuit BUF may independently store the pixel codes PC_OB of the optical black area OB and the pixel codes PC_ACT of the active area ACT.

The dark level compensation circuit DCC may receive the pixel codes PC_OB of the optical black area OB and the pixel codes PC_ACT of the active area ACT from the buffer circuit BUF. The dark level compensation circuit DCC may perform the dark level compensation operation on the pixel codes PC_ACT of the active area ACT, based on the pixel codes PC_OB of the optical black area OB. In this case, digital codes generated through the dark level compensation operation may be referred to as "compensated pixel codes PC_CP". The dark level compensation circuit DCC may provide the compensated pixel codes PC_CP to the first signal processing circuit SPC1.

The first to eighth signal processing circuits SPC1 to SPC8 may sequentially process the compensated pixel codes PC_CP. For example, the first to eighth signal processing circuits SPC1 to SPC8 may generate the processed pixel codes PRC_PC by performing the processing operations on the compensated pixel codes PC_CP in series.

The cropping circuit CRPC may receive the processed pixel codes PRC_PC. In this case, the cropping circuit CRPC may operate in a passing mode to pass the processed pixel codes PRC_PC. For example, the cropping circuit CRPC may output the processed pixel codes PRC_PC as the image frame data IFD.

In an embodiment, an operation in which the cropping circuit CRPC outputs the processed pixel codes PRC_PC may be referred to as a "passing operation".

Figure 9:
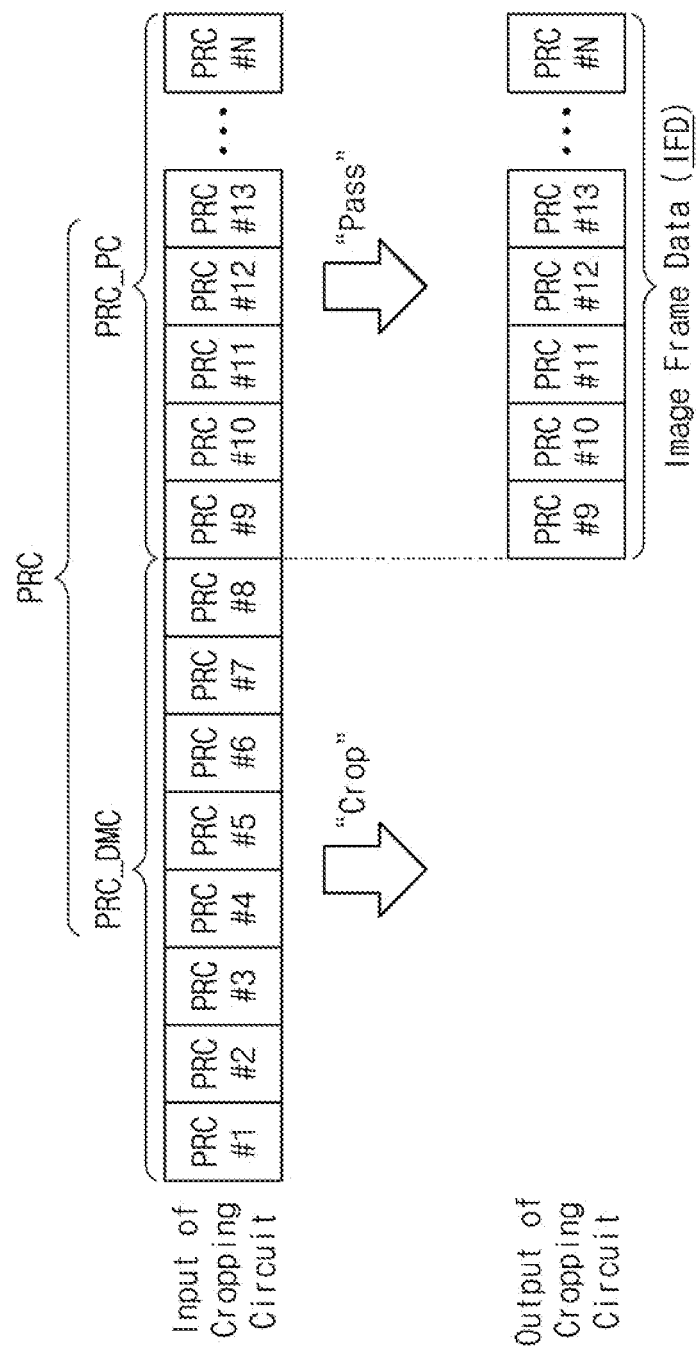
FIG. 9 is a diagram illustrating an operation of a cropping circuit of FIG. 8 in detail, according to an embodiment.

FIG. 9 is a diagram illustrating an operation of a cropping circuit of FIG. 8 in detail. Referring to FIGS. 6 to 9, the cropping circuit CRPC may receive first to N-th processed codes PRC #1 to PRC #N. Below, an embodiment in which the first to N-th processed codes PRC #1 to PRC #N are provided to the cropping circuit CRPC in a time-series manner will be described as an example.

In an embodiment, the first to N-th processed codes PRC #1 to PRC #N may be provided to the cropping circuit CRPC at different points in time. For example, the first processed code PRC #1 may be provided to the cropping circuit CRPC at a first time point, and the second processed code PRC #2 may be provided to the cropping circuit CRPC at a second time point. However, embodiments are not limited thereto.

The cropping circuit CRPC may determine one or more processed codes, which may be first received in the time-series manner, from among the first to N-th processed codes PRC #1 to PRC #N as the processed dummy codes PRC_DMC. For example, the cropping circuit CRPC may determine eight processed codes (e.g., the first to eighth processed codes PRC #1 to PRC #8) which are first received in the time-series manner as the processed dummy codes PRC_DMC. However, embodiments are not limited to the number of processed codes determined as the processed dummy codes PRC_DMC.

The cropping circuit CRPC may perform the cropping operation on the processed codes (e.g., the first to eighth processed codes PRC #1 to PRC #8) determined as the processed dummy codes PRC_DMC. For example, the cropping circuit CRPC may operate in the cropping mode while the first to eighth processed codes PRC #1 to PRC #8 are received. In this case, the cropping circuit CRPC may not output the first to eighth processed codes PRC #1 to PRC #8 as the image frame data IFD.

The cropping circuit CRPC may determine processed codes which are not determined as the processed dummy codes PRC_DMC from among the first to N-th processed codes PRC #1 to PRC #N as the processed pixel codes PRC_PC. For example, the cropping circuit CRPC may determine the remaining ninth to N-th processed codes PRC

9 to PRC #N, other than the first to eighth processed codes PRC #1 to PRC #8, as the processed pixel codes PRC_PC.

The cropping circuit CRPC may perform the passing operation on the processed codes (e.g., the ninth to N-th processed codes PRC #9 to PRC #N) determined as the processed pixel codes PRC_PC. For example, the cropping circuit CRPC may operate in the passing mode while the ninth to N-th processed codes PRC #9 to PRC #N are received. In this case, the cropping circuit CRPC may output the ninth to N-th processed codes PRC #9 to PRC #N without modification. Accordingly, the image frame data IFD may include the ninth to N-th processed codes PRC #9 to PRC #N.

In an embodiment, the cropping circuit CRPC may include a counter that stores a value of counting the number of received processed codes PRC.

In an embodiment, the cropping circuit CRPC may operate based on the value of counting the number of received processed codes PRC. For example, the cropping circuit CRPC may count the number of received processed codes PRC. In this case, the cropping circuit CRPC may operate in the cropping mode before the number of received processed codes PRC exceeds a threshold value and may operate in the passing mode after the number of received processed codes PRC exceeds the threshold value. An example of an operation of the cropping circuit CRPC that is performed based on the value of counting the number of received processed codes PRC is described in detail with reference to FIG. 14.

Figure 10:
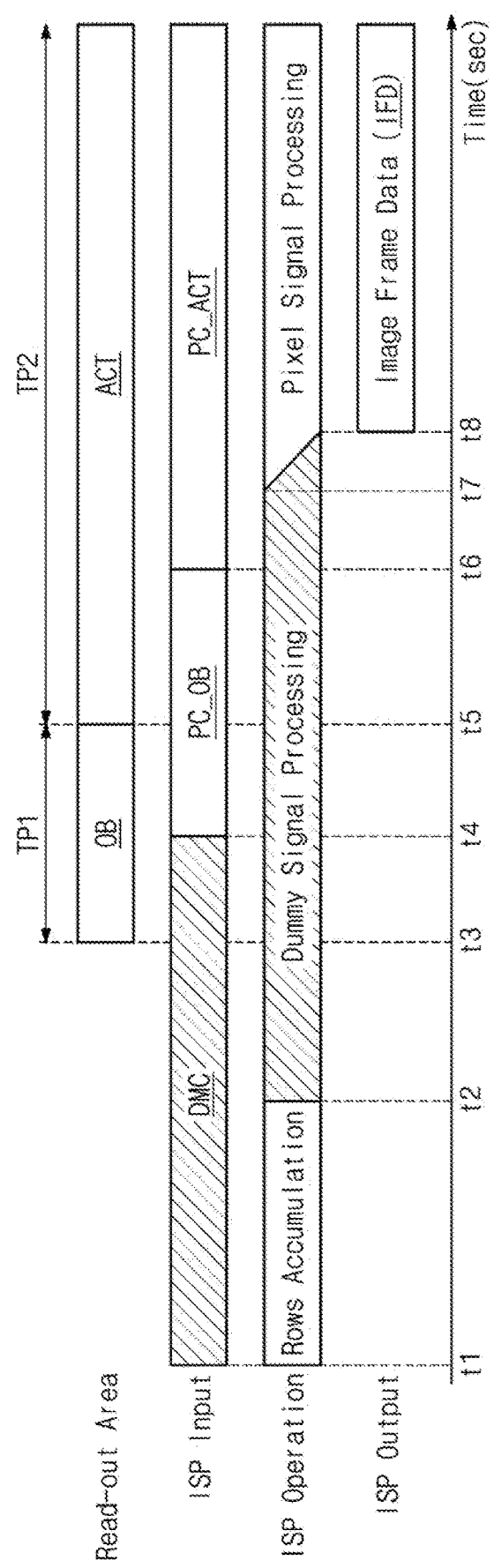
FIG. 10 is a timing diagram illustrating an operation of an image sensor device of FIG. 6, according to an embodiment.

FIG. 10 is a timing diagram illustrating an operation of an image sensor device of FIG. 6. Referring to FIGS. 6, 7, and 10, during a first time period TP1 from t3 to t5, the optical black area OB may be read out: during a second time period TP2 from the fifth time point t5, the active area ACT may be read out. For example, the readout operation of the active area ACT may be performed after the readout operation of the optical black area OB is completed.

In the time period from t4 to t6, the image signal processor 140 may receive the pixel codes PC_OB of the optical black area OB. After the sixth time point t6, the image signal processor 140 may receive the pixel codes PC_ACT of the active area ACT. For example, the analog-to-digital converter 130 may provide the pixel codes PC to the image signal processor 140 from the fourth time point t4.

The image signal processor 140 may receive the dummy codes DMC prior to the first time period TP1. For example, the image signal processor 140 may receive the dummy codes DMC during the time period from t1 to t4. For example, the dummy code generator DCG may provide the dummy codes DMC to the image signal processor 140 during the time period from t1 to t4.

Below, for brevity of description, an embodiment in which the dummy code generator DCG outputs the dummy codes DMC until the pixel codes PC_OB of the optical black area OB are provided to the image signal processor 140 (e.g., until the fourth time point t4) is described as an example, but embodiments are not limited thereto.

For example, the image signal processor 140 may perform the rows accumulation operation during the time period from t1 to t2. For example, the image signal processor 140 may sequentially receive the dummy codes DMC to be stored in the buffer circuit BUF.

After the second time point t2, the image signal processor 140 may perform the signal processing operation. For example, the image signal processor 140 may perform the dummy signal processing operation on the dummy codes DMC and may perform the pixel signal processing operation on the pixel codes PC.

During the time period from t2 to t8, the image signal processor 140 may perform the dummy signal processing operation. For example, the image signal processor 140 may generate the processed dummy codes PRC_DMC by performing the signal processing operations on the dummy codes DMC through the first to eighth signal processing circuits SPC1 to SPC8. In this case, in the time period from t2 to t3, the power consumption of the image signal processor 140 may gradually increase: after the third time point t3, the power consumption of the image signal processor 140 may be maintained uniformly.

After the seventh time point t7, the image signal processor 140 may perform the pixel signal processing operation. For example, the image signal processor 140 may perform the dark level compensation operation on the pixel codes PC_ACT of the active area ACT, based on the pixel codes PC_OB of the optical black area OB. The image signal processor 140 may generate the processed pixel codes PRC_PC by performing the signal processing operations on the compensated pixel codes PC_CP through the first to eighth signal processing circuits SPC1 to SPC8. In an embodiment, during the time period from t7 to t8, the number of components of the image signal processor 140 performing the dummy signal processing operation may gradually decrease. In contrast, during the time period from t7 to t8, the number of components of the image signal processor 140 performing the pixel signal processing operation may gradually increase. In this case, during the time period from t7 to t8, the number of components of the image signal processor 140 performing the signal processing operation may be uniform. For example, according to an embodiment of the present disclosure, the power consumption of the image signal processor 140 after the third time point t3 may be maintained uniformly.

Therefore, according to an embodiment of the present disclosure, the power consumption of the image signal processor 140 may be uniform in the first time period TP1 and the second time period TP2. An example of an operation of the image signal processor 140 is described in detail with reference to FIG. 11.

After the eighth time point t8, the image signal processor 140 may output the image frame data IFD corresponding to the processed pixel codes PRC_PC. For example, the cropping circuit CRPC may crop the processed dummy codes PRC_DMC received before the eighth time point t8 and may output the processed pixel codes PRC_PC received after the eighth time point t8 as the image frame data IFD.

Figure 11:
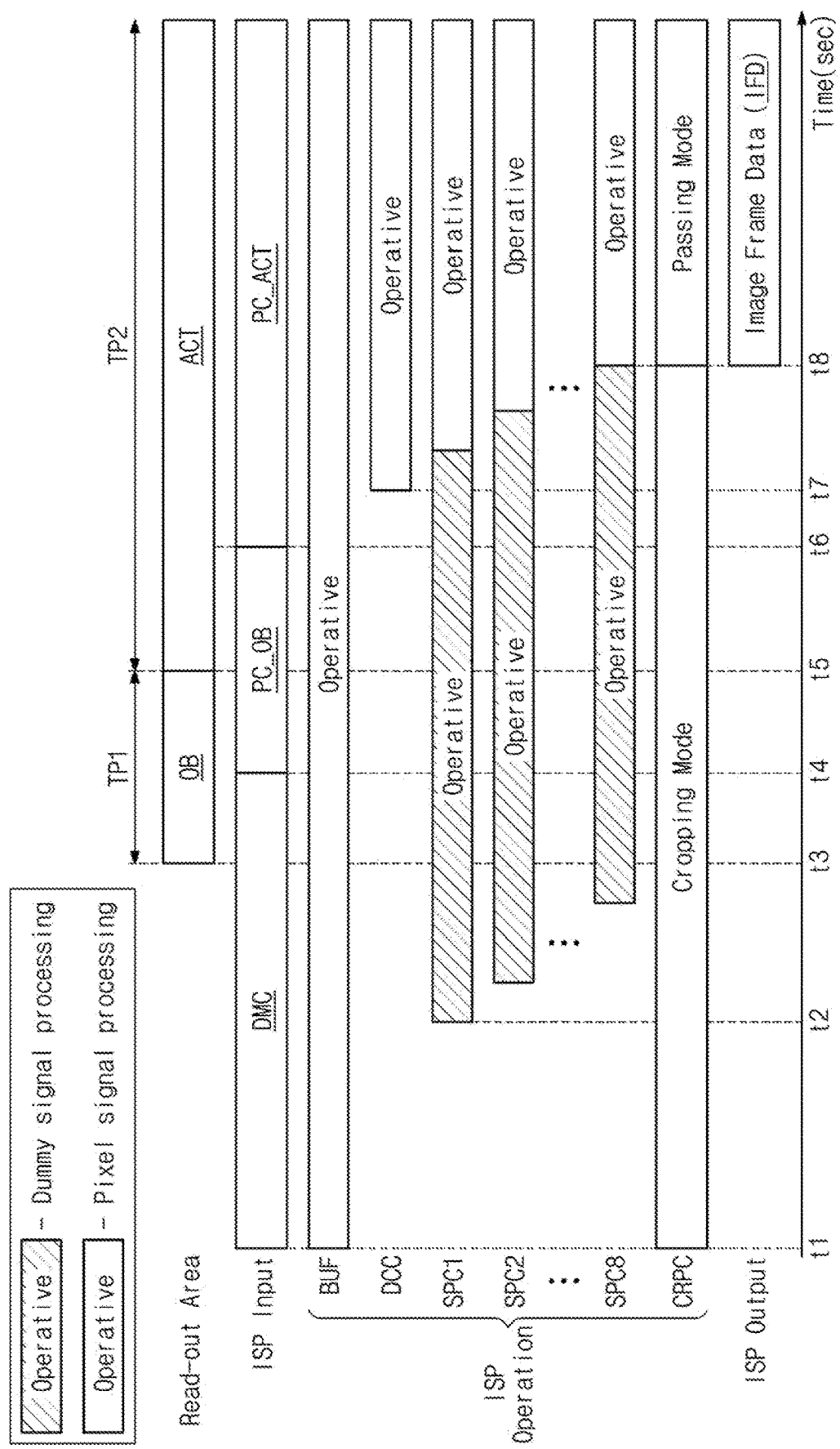
FIG. 11 is a timing diagram illustrating an operation of an image signal processor illustrated in FIG. 10 in detail, according to an embodiment.

FIG. 11 is a timing diagram illustrating an operation of an image signal processor illustrated in FIG. 10 in detail. Referring to FIGS. 6 to 11, the buffer circuit BUF may continuously operate from the first time point t1 when the dummy codes DMC are received. For example, the buffer circuit BUF may operate as a working memory of the first to eighth signal processing circuits SPC1 to SPC8. For brevity, additional description associated with the above operations of the image sensor device 100 in the time period from t1 to t7 may be omitted to avoid redundancy.

In the time period from t2 to t3, the first to eighth signal processing circuits SPC1 to SPC8 may sequentially start operations. For example, before the readout operation is performed on the optical black area OB, the first to eighth signal processing circuits SPC1 to SPC8 may start the dummy signal processing operation (denoted by a block with stripes in FIG. 11). In this case, in the period from t2 to t3, the power consumption of the image signal processor 140 may gradually increase depending on the number of processing circuits operating.

After the seventh time point t7, the dark level compensation circuit DCC may perform the dark level compensation operation. For example, after the pixel codes PC_ACT of the active area ACT are received, the dark level compensation circuit DCC may perform the dark level compensation operation based on the pixel codes PC_OB of the optical black area OB.

In the time period from t7 to t8, each of the first to eighth signal processing circuits SPC1 to SPC8 may perform the signal processing operation on either the dummy codes DMC or the pixel codes PC. For example, the first to eighth signal processing circuits SPC1 to SPC8 may sequentially start the pixel signal processing operations (denoted by a block without stripes in FIG. 11). For example, a time point when the first signal processing circuit SPC1 starts the signal processing operation on the pixel codes PC may be sooner than a time point when the second signal processing circuit SPC2 starts the signal processing operation on the pixel codes PC. However, embodiments are not limited thereto.

In the time period from t1 to t8, the cropping circuit CRPC may operate in the cropping mode. In this case, even though the processed codes PRC may be received, the cropping circuit CRPC may not output the processed codes PRC to the outside of the image signal processor 140.

In contrast, after the eighth time point t8, the cropping circuit CRPC may operate in the passing mode. In this case, the cropping circuit CRPC may output the received processed codes PRC as the image frame data IFD to the outside of the image signal processor 140.

For example, according to an embodiment of the present disclosure, before the readout operation of the pixel array 110 is performed, the power consumption of the image signal processor 140 may increase. In this case, a ground voltage swing phenomenon of the image sensor device 100 caused by the power consumption difference of the image sensor device 100, may be minimized.

In an embodiment, the first time period TP1 and the second time period TP2 may be time periods where the pixel array 110 is read out to generate image frame data for a first frame. In this case, the first time point t1 may be included in a blank period at which the readout operation of the pixel array 110 is not performed. For example, the first time point t1 may be included in a time period which begins at a time point when a time period at which the pixel array 110 is read out to generate image frame data for a 0-th frame before the first frame ends, and which ends at a time point when the first time period TP1 starts. An example of an operation of the image sensor device 100 that generates different frames is described in detail with reference to FIG. 15.

In an embodiment, the signal processing operation of the dummy codes DMC may start from the blank period. For example, the time period from t1 to t3 may be included in the blank period. In this case, even though the power consumption of the image signal processor 140 may increase before the readout operation of the pixel array 110 is performed, an interval between the readout operations of the pixel array 110, which may be performed to generate different frames, may not be long. Therefore, according to an embodiment of the present disclosure, the image sensor device 100 having improved performance without the decrease in the frame rate may be provided.

Figure 12:
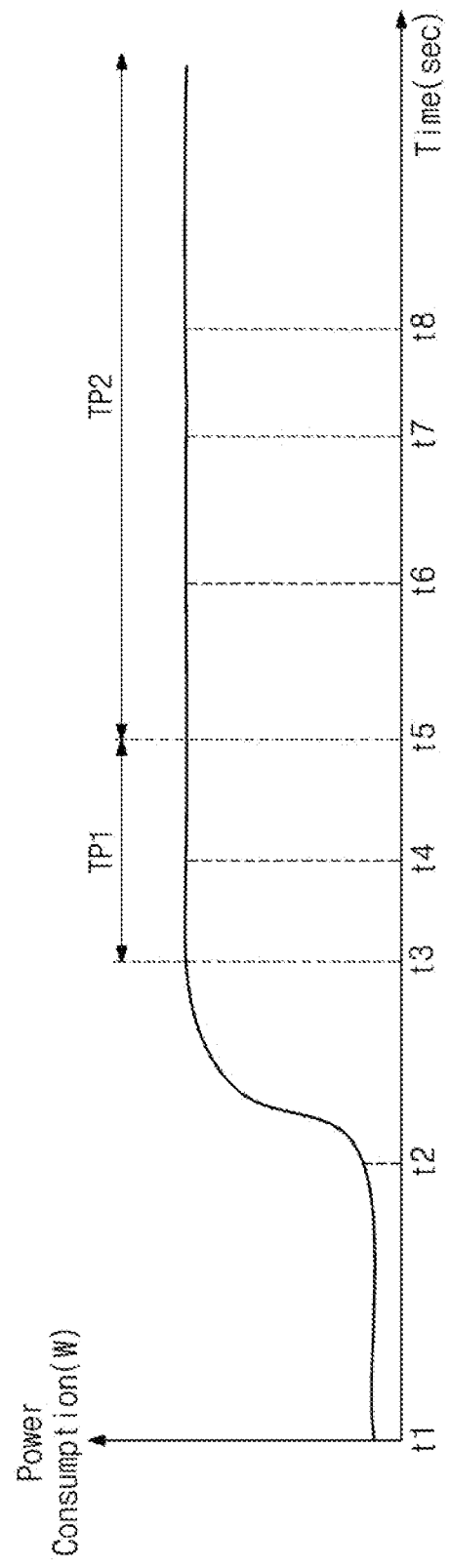
FIG. 12 is a graph illustrating power consumption in an image signal processor illustrated in FIG. 11, according to an embodiment.

FIG. 12 is a graph illustrating power consumption in an image signal processor illustrated in FIG. 11. In FIG. 12, a horizontal axis represents a time, and a vertical axis represents power consumption of the image signal processor 140.

Referring to FIGS. 6 to 12, in the time period from t1 to t2, the power consumption of the image signal processor 140 may be almost uniform. For example, in the time period from t1 to t2, only the buffer circuit BUF among the components of the image signal processor 140 may operate, and the remaining components may not operate.

In the time period from t2 to t3, the power consumption of the image signal processor 14 may gradually increase. For example, in the time period from t2 to t3, as the first to eighth signal processing circuits SPC1 to SPC8 sequentially start the signal processing operations on the dummy codes DMC, the power consumption of the image signal processor 14 may gradually increase.

After the third time point t3, the power consumption of the image signal processor 140 may be uniform. For example, after the third time point t3, the number of components of the image signal processor 140 performing the signal processing operations may be maintained almost uniformly. For example, the first to eighth signal processing circuits SPC1 to SPC8 may perform the signal processing operations until the dark level compensation circuit DCC generates the compensated pixel codes PC_CP. After the dark level compensation circuit DCC generates the compensated pixel codes PC_CP, each of the first to eighth signal processing circuits SPC1 to SPC8 may start the pixel signal processing operation.

For example, according to an embodiment of the present disclosure, the power consumption of the image sensor device 100 may be uniform in the first time period TP1 where the readout operation of the optical black area OB is performed and the second time period TP2 where the readout operation of the active area ACT is performed. Therefore, according to an embodiment of the present disclosure, because the ground voltage swing according to the time points when the pixel array 110 is read out may be minimized, the image sensor device 100 having improved performance may be provided.

Figure 13:
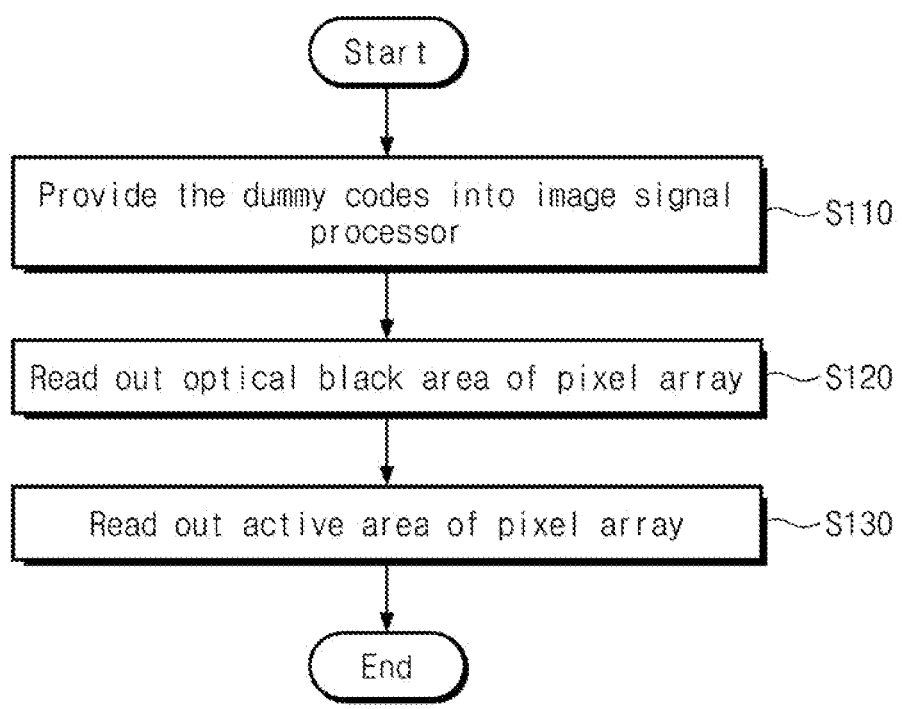
FIG. 13 is a flowchart illustrating an operation of an image sensor device of FIG. 6, according to an embodiment.

FIG. 13 is a flowchart illustrating an operation of an image sensor device of FIG. 6. Referring to FIGS. 6 to 13, in operation S110, the image sensor device 100 may provide dummy codes to the image signal processor 140. For example, before the readout operation of the pixel array 110 is performed, the sensor controller 160 may control the dummy code generator DCG such that the dummy codes DMC are generated. In this case, the image signal processor 140 may perform the signal processing operation based on the received dummy codes DMC.

In operation S120, the image sensor device 100 may read out the optical black area OB. For example, the sensor controller 160 may control the row decoder 120 such that the readout operation is performed on rows corresponding to the optical black area OB of the pixel array 110. In this case, the pixels of the optical black area OB may generate data voltages, and the generated data voltages may be converted into the pixel codes PC_OB of the optical black area OB by the analog-to-digital converter 130.

In operation S130, the image sensor device 100 may read out the active area ACT. For example, the sensor controller 160 may control the row decoder 120 such that the readout operation is performed on rows corresponding to the active area ACT of the pixel array 110. In this case, the pixels of the active area ACT may generate data voltages, and the generated data voltages may be converted into the pixel codes PC_ACT of the active area ACT by the analog-to-digital converter 130.

For example, the image signal processor 140 according to an embodiment of the present disclosure may perform the signal processing operation (e.g., the dummy signal processing operation) before the pixel array 110 is read out. Accordingly, the power consumption of the image sensor device 100 may be uniform while the pixel array 110 is read out (e.g., while operation S120 and operation S130 are performed).

Figure 14:
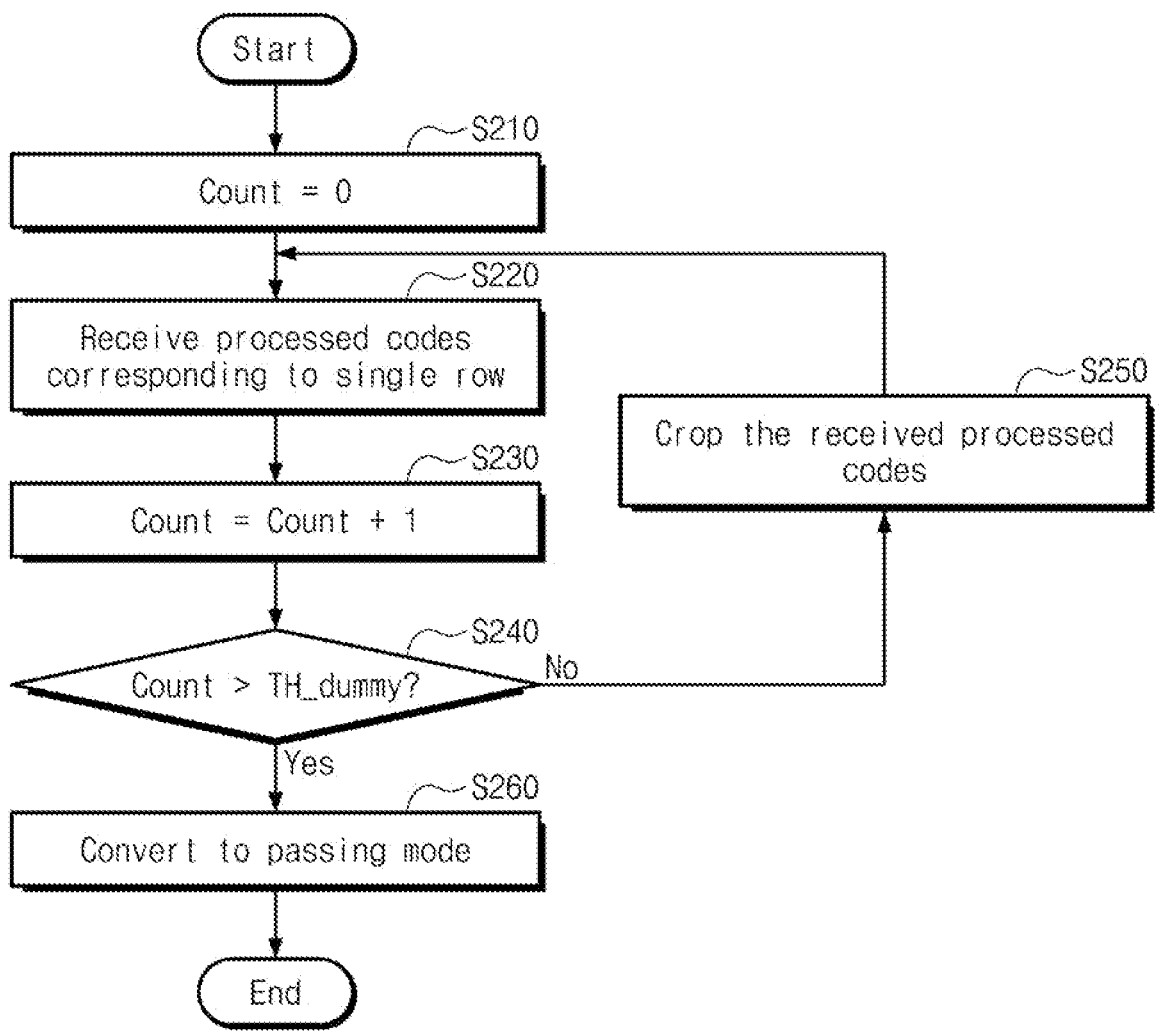
FIG. 14 is a flowchart illustrating an operation of a cropping circuit of FIG. 7, according to an embodiment.

FIG. 14 is a flowchart illustrating an operation of a cropping circuit of FIG. 7. Referring to FIGS. 6 to 11 and FIG. 14, in operation S210, the cropping circuit CRPC may set a count value to zero (0). Also, the cropping circuit CRPC may be set to the cropping mode. For example, the cropping circuit CRPC may crop the processed codes PRC received before entering the passing mode (e.g., before operation S260 below is performed).

In operation S220, the cropping circuit CRPC may receive processed codes corresponding to a single row. For example, the cropping circuit CRPC may receive the processed codes PRC corresponding to one row of a frame to be generated.

In operation S230, the cropping circuit CRPC may increase the count value by one (1).

In operation S240, the cropping circuit CRPC may determine whether the count value reaches a threshold value TH_dummy. In this case, the threshold value TH_dummy may be used to determine whether the received processed codes PRC are generated based on the dummy codes DMC.

In an embodiment, when the count value is less than or equal to the threshold value TH_dummy, the cropping circuit CRPC may determine that the received processed codes PRC are generated based on the dummy codes DMC. In this case, operation S250 may be performed.

In an embodiment, when the count value is greater than the threshold value TH_dummy, the cropping circuit CRPC may determine that the received processed codes PRC are generated based on the pixel codes PC. In this case, operation S260 may be performed.

In operation S250, the cropping circuit CRPC may crop the received processed codes PRC. For example, the cropping circuit CRPC may not output the received processed codes PRC to the outside of the image signal processor 140. After operation S250 is performed, the cropping circuit CRPC may again perform operation S220. For example, the cropping circuit CRPC may sequentially receive the processed codes PRC until the count value is greater than the threshold value TH_dummy.

In operation S260, the cropping circuit CRPC may switch from the cropping mode to the passing mode. In this case, the cropping circuit CRPC may sequentially output the processed codes PRC received after switching to the passing mode, as the image frame data IFD.

Figure 15:
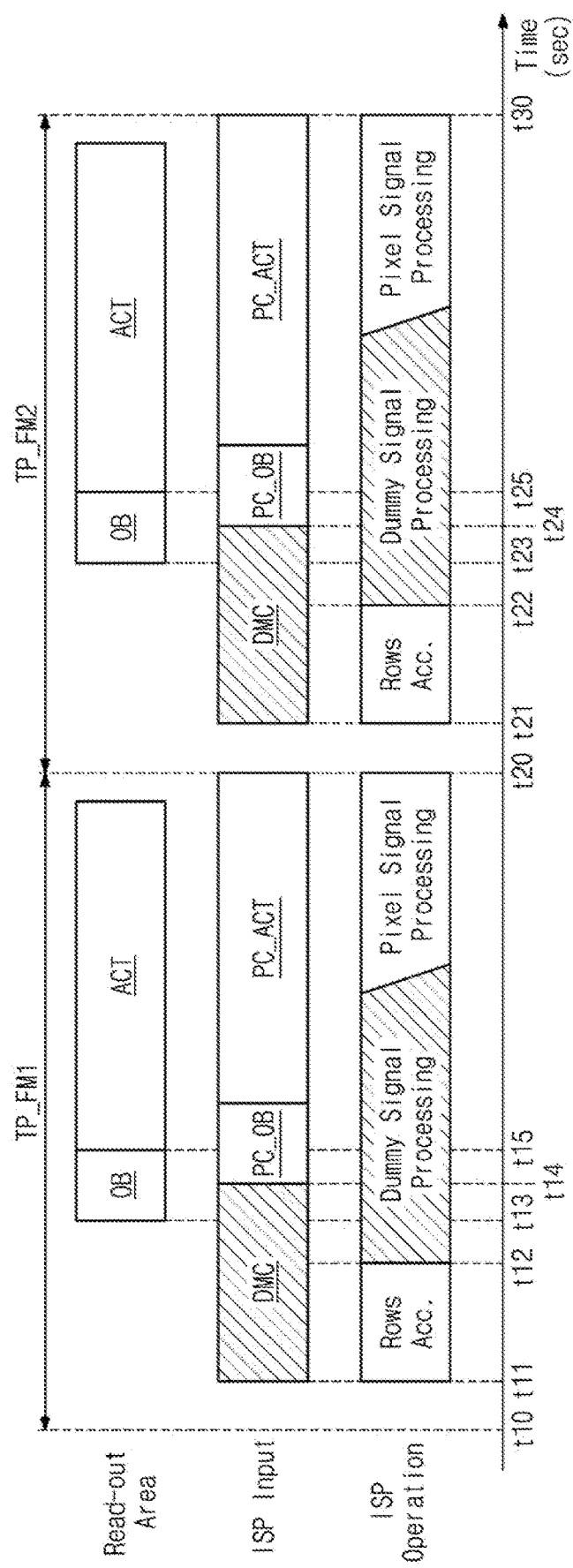
FIG. 15 is a timing diagram illustrating an operation of an image sensor device, which is associated with a plurality of frames, according to an embodiment.

FIG. 15 is a timing diagram illustrating an operation of an image sensor device, which is associated with a plurality of frames. Referring to FIG. 15, during a first frame time period TP_FM1 from t10 to t20, the image sensor device 100 may perform an operation for generating image frame data for a first frame. During a second frame time period TP_FM2 from t20 to t30, the image sensor device 100 may perform an operation for generating image frame data for a second frame.

In an embodiment, a length of the first frame time period TP_FM1 may be identical to a length of the second frame time period TP_FM2. For example, the length of the first frame time period TP_FM1 and the second frame time period TP_FM2 may be referred to as a "frame time length". In this case, a time length between time points included in the time period from t10 to t20 may be shorter than the frame time length.

In an embodiment, the frame time length may correspond to a reciprocal of the frame rate of the image sensor device 100.

First, referring to the first frame time period TP_FM1, the image sensor device 100 may perform the readout operation of the pixel array 110 after the 13th time point t13. For example, the image sensor device 100 may perform the readout operation on the optical black area OB during the time period from t13 to t15.

The image signal processor 140 may receive the dummy codes DMC from the 11th time point t11 preceding the 13th time point t13. For example, the image signal processor 140 may receive the dummy codes DMC during the time period from t11 to t14. In this case, the image signal processor 140 may perform the signal processing operation (e.g., the dummy signal processing operation and the pixel signal processing operation) from the 12th time point t12. The operations of the image sensor device 100 in the time period from t11 to t15 may be respectively similar to the operations of the image sensor device 100 in the time period from t1 to t5 described with reference to FIGS. 10 to 12, and thus, additional description may be omitted to avoid redundancy.

The image signal processor 140 may output image frame data for the first frame during the first frame time period TP_FM1. For example, the image signal processor 140 may output the image frame data for the first frame until the 20th time point t20.

Then, referring to the second frame time period TP_FM2, the image sensor device 100 may perform the readout operation of the pixel array 110 after the 23th time point t23. For example, the blank period may be included between the time period at which the readout operation of the first frame time period TP_FM1 is performed and the time period at which the readout operation of the second frame time period TP_FM2 is performed.

The image sensor device 100 may receive the dummy codes DMC from the 21st time point t21. The image signal processor 140 may receive the dummy codes DMC during the time period from t21 to t24. The image signal processor 140 may perform the signal processing operation from the 22nd time point t22. The operations of the image sensor device 100 in the time period from t21 to t25 may be respectively similar to the operations of the image sensor device 100 in the time period from t1 to t5 described with reference to FIGS. 10 to 12, and thus, additional description may be omitted to avoid redundancy.

The dummy codes DMC may begin to be received from the blank period from a time point when the readout operation for the first frame is completely performed to a time point when the readout operation for the second frame starts. In other words, the 21st time point t21 may be included in the blank period. In this case, even if the interval between the readout operations for the first and second frames does not increase, the dummy codes DMC may be provided to the image signal processor 140. Therefore, according to an embodiment of the present disclosure, the image sensor device 100 having improved performance without the decrease in the frame rate may be provided.

Figure 16:
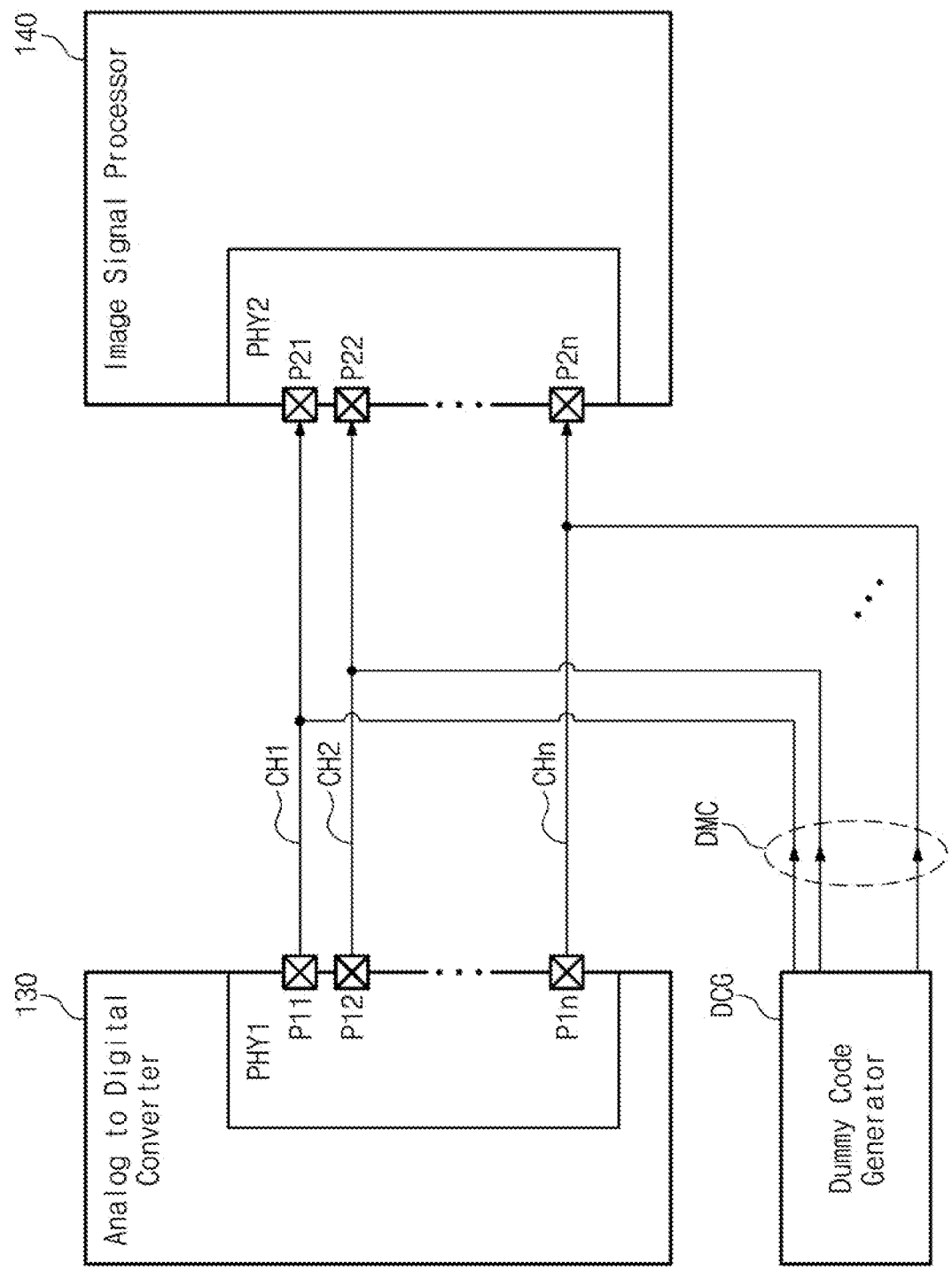
FIG. 16 is a block diagram illustrating an analog-to-digital converter, a dummy code generator, and an image signal processor of FIG. 6 in detail, according to an embodiment.

FIG. 16 is a block diagram illustrating an analog-to-digital converter, a dummy code generator, and an image signal processor of FIG. 6 in detail. Referring to FIGS. 6 and 16, the analog-to-digital converter 130 may include a first physical layer PHY1. The image signal processor 140 may include a second physical layer PHY2.

The first physical layer PHY1 and the second physical layer PHY2 may be connected to each other through first to n-th channels CH1 to CHn. For example, the first physical layer PHY1 may include pins P11 to P1n respectively connected to the first to n-th channels CH1 to CHn. The second physical layer PHY2 may include pins P21 to P2n respectively connected to the first to n-th channels CH1 to CHn.

The analog-to-digital converter 130 may transmit the pixel codes PC to the second physical layer PHY2 of the image signal processor 140. For example, the analog-to-digital converter 130 may transmit the pixel codes PC to the image signal processor 140 through the first to n-th channels CH1 to CHn.

The dummy code generator DCG may transmit the dummy codes DMC to the second physical layer PHY2 of the image signal processor 140. For example, the dummy code generator DCG may provide the dummy codes DMC to the first to n-th channels CH1 to CHn. For example, the image signal processor 140 may receive the dummy codes DMC and the pixel codes PC through the same physical layer (e.g., the second physical layer PHY2). However, embodiments are not limited thereto.

Figure 17:
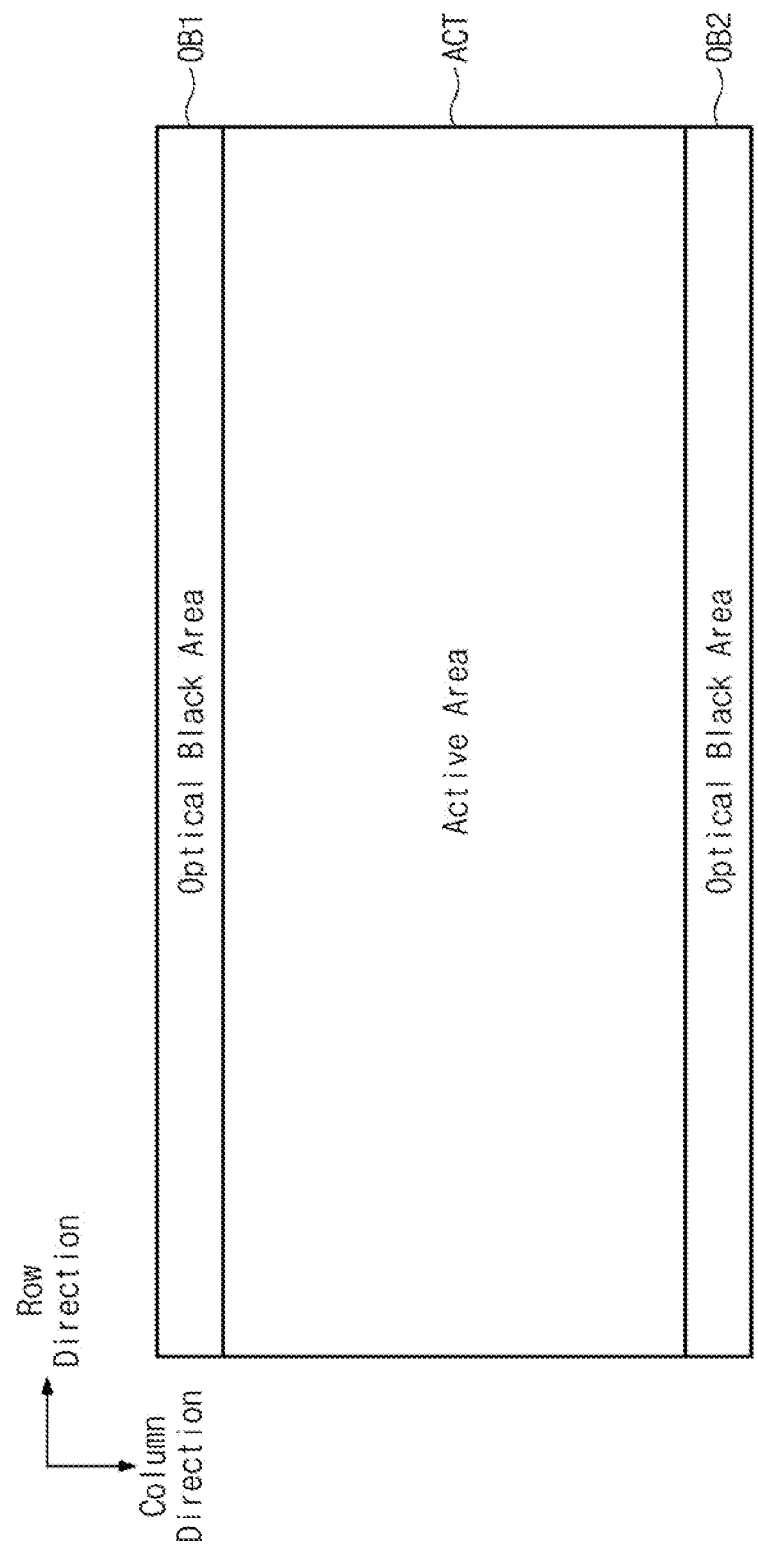
FIG. 17 is a diagram illustrating a portion of a pixel array of FIGS. 1 and 6 in detail, according to an embodiment.

FIG. 17 is a diagram illustrating a portion of a pixel array of FIGS. 1 and 6 in detail. For brevity of description, below, the pixel array 110 of FIG. 6 is described as an example. However, embodiments are not limited thereto.

Referring to FIGS. 6 and 17, the pixel array 110 may include the optical black area OB and the active area ACT. The optical black area OB may include a first optical black area OB1 and a second optical black area OB2.

The active area ACT may be interposed between the first optical black area OB1 and the second optical black area OB2. For example, the active area ACT may be interposed between rows of the first optical black area OB1 and rows of the second optical black area OB2.

In an embodiment, the number of rows included in the first and second optical black areas OB1 and OB2 may be less than the number of rows included in the active area ACT.

In an embodiment, when the readout operation of the pixel array 110 is performed, the readout operation of the active area ACT may be performed after the readout operations of the first and second optical black areas OB1 and OB2 are performed. For example, when the readout operation for a single frame is performed, the readout operation of the active area ACT may be performed after the readout operation of the optical black area OB is performed. However, embodiments are not limited thereto.

Figure 18:
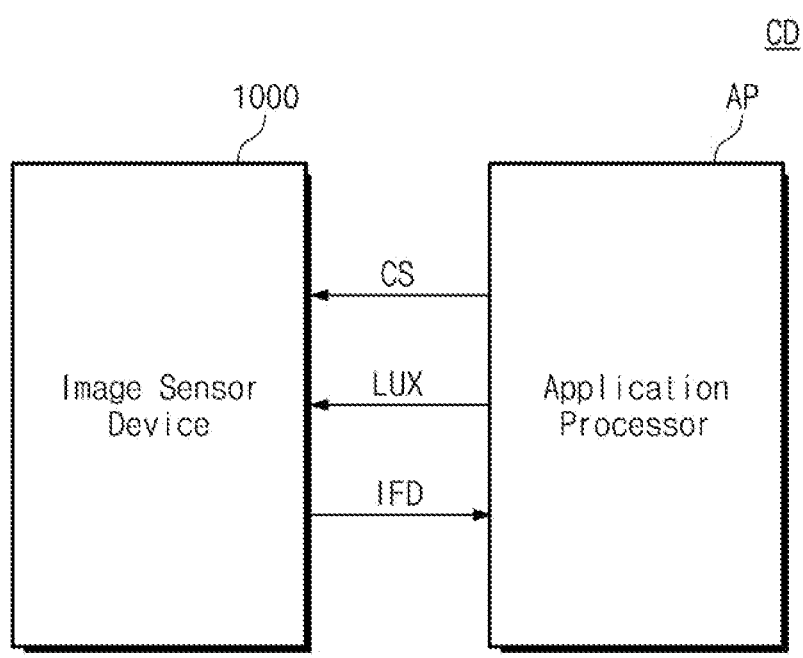
FIG. 18 is a block diagram illustrating a camera device according to an embodiment.

FIG. 18 is a block diagram illustrating a camera device according to an embodiment of the present disclosure. Referring to FIG. 18, a camera device CD may include an image sensor device 1000 and an application processor AP.

The application processor AP may provide a control signal CS to the image sensor device 1000 to control an overall operation of the image sensor device 1000. The image sensor device 1000 may operate in response to the control signal CS.

In an embodiment, the control signal CS may be provided to the image sensor device 1000 through a camera control interface (CCI). However, embodiments are not limited thereto.

In an embodiment, the camera device CD may operate in various modes such as a night mode, a portrait mode, and a hyperlapse mode. In this case, the detailed operation method of the image sensor device 1000 may be determined based on the operation mode of the camera device CD.

In an embodiment, an operation of an image signal processor of the image sensor device 1000 may be determined based on the operation mode of the camera device CD. For example, the detailed operation method of each component of the image signal processor (e.g., the number of pixel codes necessary for performing the bad pixel compensation operation) may change depending on the operation mode of the camera device CD. In this case, a time point when the image signal processor starts to perform the signal processing operation on the pixel codes may change depending on the operation mode of the camera device CD.

In an embodiment, a length of a time period at which a dummy code is provided to the image signal processor may change depending on the time point when the image signal processor starts to perform the signal processing operation on the pixel codes. For example, when the time point when the image signal processor starts to perform the signal processing operation on the pixel codes is advanced, a time point when the signal processing operation of the dummy codes starts to be performed should be advanced to advance a time point when the power consumption of the image signal processor increases. In this case, the time point when the dummy codes are provided to the image signal processor should be advanced.

The application processor AP may measure an illuminance LUX (e.g., external illuminance) of an environment in which the camera device CD is exposed, based on the image frame data IFD provided from the image sensor device 1000. In embodiments, the illuminance LUX may be an illuminance value. However, embodiments are not limited to the method where the application processor AP measures illuminance. For example, the application processor AP may measure the illuminance through a separate illuminance sensor included in the camera device CD.

In an embodiment, the image sensor device 1000 may provide the image frame data IFD to the application processor AP through the mobile industry processor interface (MIPI). However, embodiments are not limited thereto.

The image sensor device 1000 may receive the measured illuminance LUX from the application processor AP. The image sensor device 1000 may determine an operation mode based on the illuminance LUX. For example, the image sensor device 1000 may operate in a pre-dummy mode or a normal mode based on the illuminance LUX.

In an embodiment, a configuration of the image sensor device 1000 may be similar to that of the image sensor device 100 illustrated in FIG. 6. In an embodiment, the image sensor device 1000 may include a pixel array, a row decoder, an analog-to-digital converter, an image signal processor, an I/O circuit, a sensor controller, and a dummy code generator. Examples of configurations and functions of detailed components of the image sensor device 1000 are described in detail with reference to the above drawings, and thus, additional description may be omitted to avoid redundancy.

The pre-dummy mode may refer to a mode in which the image sensor device 1000 operates in the method described with reference to FIGS. 6 to 16. For example, when the image sensor device 1000 operates in the pre-dummy mode, dummy codes may be provided to the image signal processor before the readout operation of the pixel array is performed.

In an embodiment, in the low-illuminance environment, the dark level compensation operation may have a relatively great influence on the image frame data IFD. For example, in the low-illuminance environment, the magnitude of the pixel codes PC_ACT of the active area ACT may be almost similar to the magnitude of the pixel codes PC_OB of the optical black area OB. In this case, even if a small error occurs in the generated pixel codes PC, relatively great distortion may be included in the image frame data IFD.

Accordingly, the image sensor device 1000 may be configured to operate in the pre-dummy mode in the low-illuminance environment. In this case, because power consumption may be uniform while the readout operation of the pixel array is performed, the dark level compensation operation may have improved performance.

The normal mode may refer to a mode in which the image sensor device 1000 operates in the method described with reference to FIGS. 1 to 5. For example, when the image sensor device 1000 operates in the normal mode, the components of the image signal processor may sequentially operate after pixel codes are received.

In an embodiment, in the high-illuminance environment, the influence of the dark level compensation operation on the image frame data IFD may be relatively small. For example, in the high-illuminance environment, the magnitude of the pixel codes PC_ACT of the active area ACT may be significantly larger than the magnitude of the pixel codes PC_OB of the optical black area OB. Accordingly, even though an error may occur in the generated pixel codes PC, distortion may hardly occur in the image frame data IFD.

Accordingly, the image sensor device 1000 may be configured to operate in the normal mode in the high-illuminance environment. In this case, the dummy code generator and the cropping circuit may not operate, and because the image signal processor does not operate based on the dummy codes, the amount of power consumption of the image sensor device 1000 may decrease.

In an embodiment, when the image sensor device 1000 operates in the pre-dummy mode, the dummy code generator may be configured to generate the dummy codes. In contrast, when the image sensor device 1000 operates in the normal mode, the dummy code generator may be configured to not generate the dummy codes.

Figure 19:
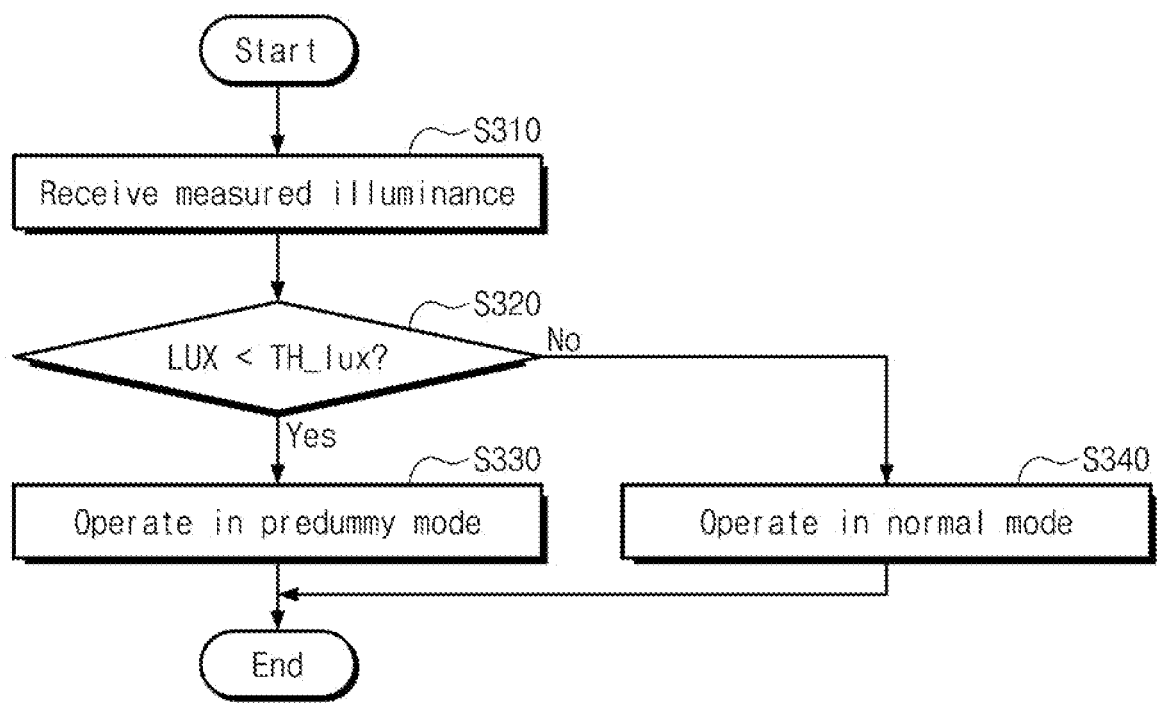
FIG. 19 is a flowchart illustrating an operation of an image sensor device of FIG. 18, according to an embodiment.
Figure 20:
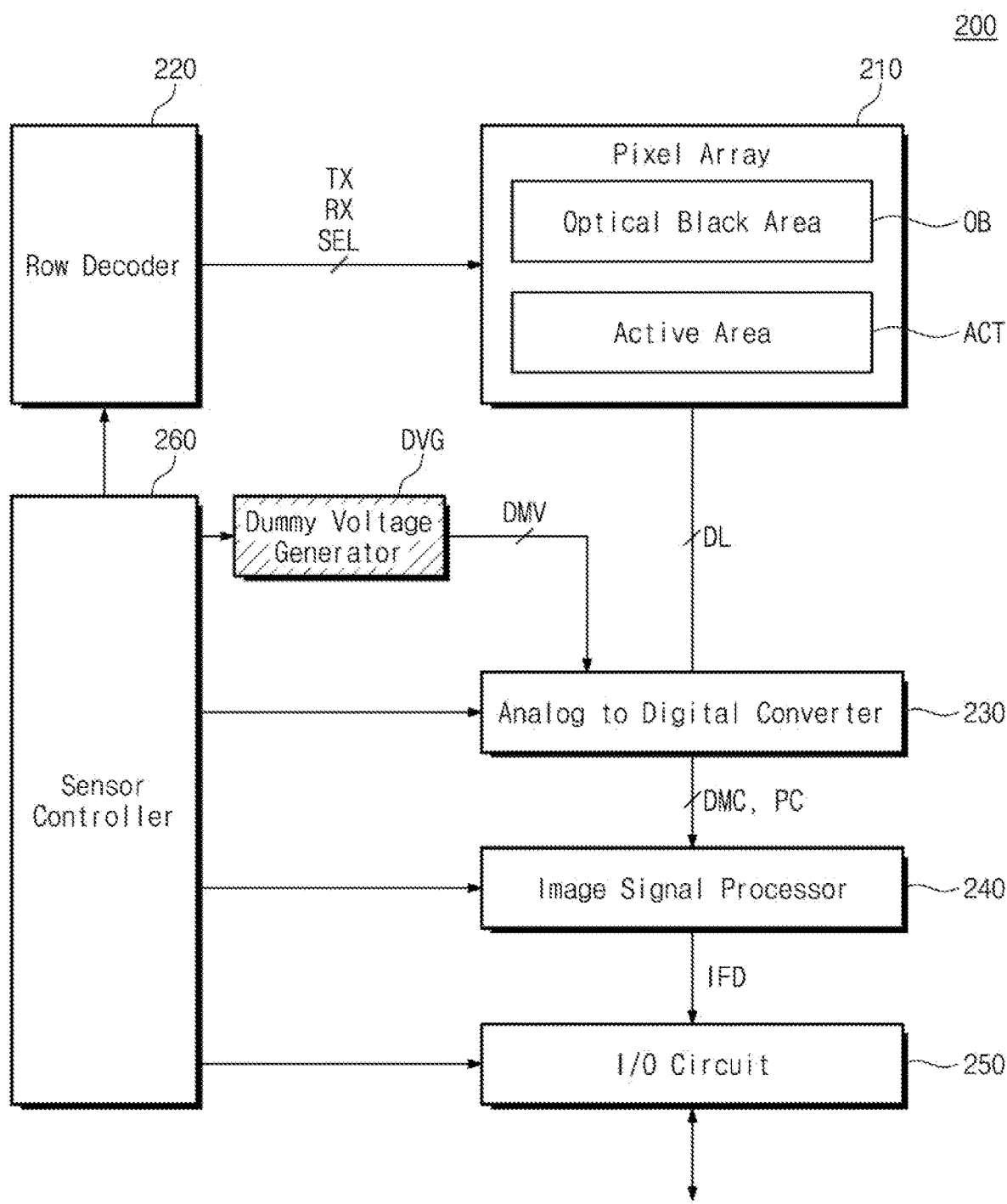
FIG. 20 is a diagram illustrating an image sensor device according to an embodiment.

FIG. 19 is a flowchart illustrating an operation of an image sensor device of FIG. 18. Referring to FIGS. 19 and 20, in operation S310, the image sensor device 1000 may receive the measured illuminance LUX.

In operation S320, the image sensor device 1000 may determine whether the illuminance LUX is smaller than a threshold value TH_lux. When the illuminance LUX is smaller than the threshold value TH_lux (e.g., in the case of the low-illuminance environment), operation S330 may be performed. When the illuminance LUX is greater than the threshold value TH_lux (e.g., in the case of the high-illuminance environment), operation S340 may be performed.

In operation S330, the image sensor device 1000 may operate in the pre-dummy mode. For example, operations of the image sensor device 1000 may be similar to those described with reference to FIG. 6 to FIG. 16.

In operation S340, the image sensor device 1000 may operate in the normal mode. For example, operations of the image sensor device 1000 may be similar to those described with reference to FIG. 1 to FIG. 5.

Therefore, according to an embodiment of the present disclosure, because the accuracy of the image frame data IFD and power consumption are flexibly determined depending on the illuminance, an image sensor device having improved performance may be provided.

In an embodiment, when the image sensor device 1000 operates in the normal mode, the power of the image sensor device 1000 consumed in the readout operation of the optical black area OB may be referred to as a "first power". When the image sensor device 1000 operates in the normal mode, the power of the image sensor device 1000 consumed in the readout operation of the active area ACT may be referred to as a "second power". When the image sensor device 1000 operates in the pre-dummy mode, the power of the image sensor device 1000 consumed in the readout operation of the optical black area OB may be referred to as a "third power". When the image sensor device 1000 operates in the pre-dummy mode, the power of the image sensor device 1000 consumed in the readout operation of the active area ACT may be referred to as a "fourth power". In this case, a difference between the third power and the fourth power may be smaller than a difference between the first power and the second power.

FIG. 20 is a diagram illustrating an image sensor device according to an embodiment of the present disclosure. Referring to FIG. 20, an image sensor device 200 may include a pixel array 210, a row decoder 220, an analog-to-digital converter 230, an image signal processor 240, an I/O circuit 250, a sensor controller 260, and a dummy voltage generator DVG. Functions and operations of the pixel array 210, the row decoder 220, the analog-to-digital converter 230, the image signal processor 240, the I/O circuit 250, and the sensor controller 260 may be similar to those described with reference to FIG. 1, and thus, additional description may be omitted to avoid redundancy.

The dummy voltage generator DVG may provide dummy voltages DMV to analog-to-digital converter 230 under control of the sensor controller 260. For example, before the readout operation is performed on the optical black area OB, the dummy voltage generator DVG may provide the dummy voltages DMV to the analog-to-digital converter 230.

In an embodiment, the analog-to-digital converter 230 may receive the dummy voltages DMV from the dummy voltage generator DVG or the data voltages from the pixel array 210 through the same physical layer. However, embodiments are not limited thereto.

The analog-to-digital converter 230 may receive the dummy voltages DMV. The analog-to-digital converter 230 may generate the dummy codes DMC based on the dummy voltages DMV and may generate the pixel codes PC based on the data voltages.

The image signal processor 240 may receive the dummy codes DMC and the pixel codes PC from the analog-to-digital converter 230. In this case, the image signal processor 240 may operate to be similar to that described with reference to FIG. 6 to FIG. 12.

According to the embodiment disclosed in FIG. 20, before the readout operation is performed on the optical black area OB, the power consumption of the image signal processor 240 may increase. In this case, the power consumption of the image sensor device 200 may be uniform while the optical black area OB and the active area ACT are read out. Therefore, according to an embodiment of the present disclosure, an environment condition in which the optical black area OB and the active area ACT are read out (e.g., the power consumption of the image sensor device 200 and the ground voltage of the image sensor device 200) may be uniform, and the dark level compensation operation of the image sensor device 200 may be ideally performed.

According to an embodiment of the present disclosure, power consumption of an image sensor device may be uniform. Therefore, according to an embodiment of the present disclosure, image distortion capable of being caused by a power consumption difference of the image sensor device may be minimized.

While the some embodiments have been described above, it will be apparent to those of ordinary skill in the art that various changes and modifications may be made thereto without departing from the spirit and scope of the present disclosure as set forth in the following claims.

What is claimed is:

1. An image sensor device comprising:
a pixel array comprising a plurality of optical black pixels and a plurality of active pixels, wherein the plurality of optical black pixels are configured to be read out during a first time period to generate first data voltages, and the plurality of active pixels are configured to be read out during a second time period after the first time period to generate second data voltages;
an analog-to-digital converter configured to output first pixel codes based on the first data voltages, and to output second pixel codes based on the second data voltages;
an image signal processor configured to output image frame data based on the first pixel codes and the second pixel codes; and
a dummy code generator configured to provide dummy codes to the image signal processor during a third time period between a first time point and a second time point,
wherein the first time point is before the first time period.

2. The image sensor device of claim 1, wherein the image signal processor is further configured to perform a signal processing operation based on the dummy codes before the first time period.

3. The image sensor device of claim 1, wherein the image signal processor comprises a dark level compensation circuit configured to perform a dark level compensation operation on the second pixel codes based on the first pixel codes.

4. The image sensor device of claim 3, wherein the image signal processor further comprises a cropping circuit configured to receive first processed codes, which are generated based on the dummy codes, and second processed codes which are generated based on the dark level compensation operation, and to crop the first processed codes to generate the image frame data.

5. The image sensor device of claim 4, wherein the cropping circuit is further configured to crop the first processed codes based on a number of processed codes which are input to the cropping circuit.

6. The image sensor device of claim 1, wherein the analog-to-digital converter is further configured to provide the first pixel codes and the second pixel codes to a first physical layer of the image signal processor, and
wherein the dummy code generator is further configured to provide the dummy codes to the first physical layer.

7. The image sensor device of claim 1, wherein each active pixel of the plurality of active pixels is configured to receive a light signal, and
wherein each optical black pixel of the plurality of optical black pixels is configured to not receive a light signal.

8. The image sensor device of claim 1, wherein the plurality of optical black pixels and the plurality of active pixels form a matrix structure arranged in a row direction and a column direction, and
wherein, in the matrix structure, rows comprising the plurality of optical black pixels are different from rows comprising the plurality of active pixels.

9. The image sensor device of claim 8, wherein the plurality of optical black pixels and the plurality of active pixels are configured to be read out row by row.

10. The image sensor device of claim 1, wherein the dummy code generator comprises a linear-feedback shift register (LFSR).

11. The image sensor device of claim 1, wherein each of the dummy codes comprises a random code which is not relevant to the first data voltages and the second data voltages.

12. The image sensor device of claim 1, wherein a power consumption in the first time period corresponds to a power consumption in the second time period.

13. The image sensor device of claim 1, wherein the first time point is included in a blank period at which a readout operation of the pixel array is not performed, and
wherein the second time point is before a third time point at which the first pixel codes begin to be provided to the image signal processor.

14. The image sensor device of claim 13, wherein a length of the third time period is determined based on an operation mode of a camera device comprising the image sensor device.

15. The image sensor device of claim 1, wherein the dummy code generator is further configured to:
based on an external illuminance value being less than or equal to a first threshold value, generate the dummy codes; and
based on the external illuminance value being greater than the first threshold value, not generate the dummy codes.

16. An operation method of an image sensor device which includes a plurality of optical black pixels, a plurality of active pixels, and an image signal processor, the method comprising:
providing dummy codes to the image signal processor;
performing a first readout operation on the plurality of optical black pixels while a dummy signal processing operation is performed by the image signal processor based on the dummy codes; and
performing a second readout operation on the plurality of active pixels after the first readout operation is performed.

17. The method of claim 16, wherein the image sensor device further includes:
an analog-to-digital converter configured to generate first pixel codes based on first data voltages generated using the first readout operation, and to generate second pixel codes based on second data voltages generated using the second readout operation, and
wherein the method further comprises performing a pixel signal processing operation on the second pixel codes based on the first pixel codes.

18. The method of claim 17, further comprising:
cropping first processed codes generated based on the dummy signal processing operation such that image frame data corresponding to second processed codes generated using the pixel signal processing operation are output.

19. An image sensor device comprising:
a pixel array comprising a plurality of optical black pixels and a plurality of active pixels;
an analog-to-digital converter configured to output first pixel codes from among the plurality of optical black pixels during a first time period, and to output second pixel codes from among the plurality of active pixels during a second time period after the first time period; and
an image signal processor configured to output image frame data based on the first pixel codes and the second pixel codes, and perform a dummy signal processing operation beginning at a first time point preceding the first time period.

20. The image sensor device of claim 19, wherein the second time period ends at a second time point, and wherein a time length between the first time point and the second time point is shorter than a frame time length of the image sensor device.

* * * * *